United States Patent [19]
Hamada et al.

[11] Patent Number: 5,582,076
[45] Date of Patent: Dec. 10, 1996

[54] FLYWHEEL ASSEMBLY WITH VIBRATION DAMPENING MECHANISM

[75] Inventors: Toru Hamada, Hirakata; Kozo Yamamoto, Daito, both of Japan

[73] Assignee: Kabushiki Kaisha Daikin Seisakusho, Osaka, Japan

[21] Appl. No.: 353,351

[22] Filed: Dec. 2, 1994

[30] Foreign Application Priority Data

| Dec. 6, 1993 | [JP] | Japan | 5-065013 |
| Dec. 6, 1993 | [JP] | Japan | 5-065014 |
| Dec. 21, 1993 | [JP] | Japan | 5-068239 |

[51] Int. Cl.⁶ .................................................. F16F 15/10
[52] U.S. Cl. ........................ 74/573 F; 74/572; 464/66; 192/55.4
[58] Field of Search ................... 74/572–574 F; 464/66, 68; 192/55.4, 55.61

[56] References Cited

U.S. PATENT DOCUMENTS

| 5,048,658 | 9/1991 | Reik | 74/574 X |
| 5,180,044 | 1/1993 | Fukushima et al. | 74/574 X |
| 5,269,198 | 12/1993 | Fukushima | 74/573 F |
| 5,353,664 | 10/1994 | Yamamoto | 74/573 F |
| 5,355,747 | 10/1994 | Kajitani et al. | 74/573 F |
| 5,367,921 | 11/1994 | Fukushima | 464/68 X |
| 5,454,459 | 10/1995 | Sadakari et al. | 74/574 X |

*Primary Examiner*—Vinh T. Luong
*Attorney, Agent, or Firm*—Shinjyu Office of Patent Attorneys

[57] ABSTRACT

A flywheel assembly includes a first flywheel having an annular wall on its outer peripheral portion, a seal plate fixed to the outer peripheral portion to form an annular space between the first flywheel and the seal plate, a driven plate arranged to freely rotate relative to the first flywheel within the annular space, an elastic coupling mechanism arranged inside the annular space which elastically connects the first flywheel and the driven plate circumferentially, and a viscous dampening mechanism. The viscous dampening mechanism is formed adjacent to the outer peripheral portion inside the annular space and has a fluid filled chamber. The driven plate includes a plurality of protrusion, each one of the protrusions extending into one of the fluid filled chambers. The viscous portion has a choke formed inside the fluid filled chamber that passes fluid while the first flywheel and driven plate rotate relative to each other.

10 Claims, 19 Drawing Sheets

FLYWHEEL ASSEMBLY WITH VIBRATION DAMPENING MECHANISM

BACKGROUND OF THE INVENTION

This invention relates to a flywheel assembly having a fluid vibration dampening mechanism which includes a slider disposed in a fluid filled chamber within the vibration dampening mechanism.

Flywheel assemblies used with automobile engines are disposed between the engine of the automobile and the transmission. The flywheel assembly includes a first flywheel and a second flywheel, a driven plate that rotates integrally with the second flywheel, an elastic coupling mechanism that elastically connects the first flywheel and the driven plate circumferentially, and a viscous dampening mechanism at least partially disposed in a fluid chamber formed between both flywheels. The first flywheel is connected to the crankshaft of the engine. The clutch is coupled to the transmission and is engagable with the second flywheel. A choke is formed in the fluid chamber of the viscous dampening mechanism with allows the passage of fluid in response to relative rotation between the first flywheel and second flywheel. Viscous resistance occurring while fluid passes through the choke dampens torsional vibrations.

The fluid chamber of the viscous dampening mechanism includes a fluid chamber housing fixed to the first flywheel. An annular convex connecting portion is formed on the inner peripheral edge of the fluid chamber housing. This convex connecting portion seals the inner periphery of the fluid chamber by coupling to a concave connecting portion of the driven plate.

The outer peripheral edge of the driven plate is inserted into the fluid chamber housing from the inner peripheral side and a plurality of projections are formed at intervals circumferentially. Further, a cap shaped slider is arranged which covers the projections of the driven plate from the outer peripheral side. The slider material can freely move circumferentially within an established angle range relative to the protrusions of the driven plate. Moreover, a choke is formed inside the viscous fluid chamber that allows the passage of fluid when the slider moves relative to the first flywheel.

In this type of construction, torque fluctuations in the engine of a vehicle are transferred to the flywheel as torsional vibrations. When a small torsional vibration of a torsional angle is transmitted to the flywheel, the slider repeats a reciprocating operation relative to the protrusions of the driven plate together with the first flywheel. During this time, fluid does not flow through the choke because there is no relative movement between the slider and the first flywheel. Consequently, torsional vibrations having a small torsion angle can be effectively dampened. When a large torsional vibration of a torsional angle is transmitted to the flywheel, the slider joins to the protrusions of the driven plate and rotates relative to the first flywheel. As a result, fluid flows through the choke causing a large viscous resistance. Consequently, torsional vibrations having a large torsion angle are effectively dampened.

Conventional flywheels often have the following problems: (1) Because the fluid chamber is formed by a fluid chamber housing, the number of parts increases making construction difficult and costly, (2) Because the driven plate and the housing join to form a seal, when a small torsional vibration is transmitted to the flywheel, rubbing between the driven plate and the housing creates friction. Therefore, the resistance ends up increasing. Further, when a large torsional vibration is transmitted to the flywheel, the seal properties of the seal connecting portion is not maintained and the viscous resistance cannot be made sufficiently large. The above results make it difficult to effectively dampen differing degrees of torsional vibrations.

SUMMARY OF THE INVENTION

One purpose of this invention is to simplify the construction of viscous dampening portions of flywheel assemblies.

Another purpose of this invention is to effectively dampen different types of torsional vibrations.

In one aspect of the present invention, a flywheel assembly includes a first flywheel with an annular wall formed on its outer periphery, a seal plate fixed to an outer radial surface of the annular wall and extending radially inwardly from the annular wall. The seal plate and the first flywheel at least partially define an annular space therebetween. A driven plate is arranged to rotate freely relative to the first flywheel within the annular space, the driven plate formed with a plurality of spaced apart protrusions on its outer radial surface. An elastic coupling mechanism is disposed within the annular space elastically connecting the first flywheel and the driven plate. A fluid filled chamber defined within the outer periphery of the annular space, the protrusions extending into the chamber.

A plurality of radially spaced apart stoppers are fixed to the first flywheel within the fluid filled chamber. A plurality of sliders, each slider having a hollow interior open toward an axial center of the first flywheel, one slider disposed between each adjacent pair of the stoppers, are configured to slide radially within the chamber between the adjacent stoppers. One of each of the protrusions extends into one of each of the sliders, each one of the sliders and the adjacent stoppers defining large sub-chambers between the stoppers and on either side of the sliders, the protrusions defining small sub-chambers within each slider. A plurality of radially spaced apart seal members are disposed within the fluid filled chamber, radially inside the stoppers and the sliders, and radially adjacent to the outer radial surface of the driven plate. A gap between each adjacent pair of the seal members defines a fluid flow path between the chamber and the space.

In another aspect of the invention, the flywheel assembly includes a plurality annularly spaced apart lips which protrude in an axial direction toward the seal plate. The seal plate further includes a plurality of annularly spaced apart lips which protrude in an axial direction toward the flywheel, in general correspondence with the flywheel lips, such that the seal member engages an outer radial surface of the lips and is radially displacable with respect to the lips.

In another aspect of the invention, each of the seal members includes a thin elongated plate-like material which extends from within one of the sliders to within an adjacent one of the sliders.

In another aspect of the invention, in a torsion free state, the gap defining the fluid flow path being adjacent to but slightly offset from the protrusions on the driven plates.

In another aspect of the invention, the seal members and the sliders are integrally formed such that each of the sliders has one of the seal members extending from each radial side portion of the slider.

In yet another aspect of the invention, in a torsion free state, the gap defining the fluid flow path is adjacent to the stoppers.

In still another aspect of the invention, the seal member includes a plurality of annularly spaced apart lips formed on the first flywheel, a plurality of annularly spaced apart lips formed on the driven plate adjacent to the outer radial surface, an annular groove formed in the driven plate corresponding to the lips formed on the first flywheel, the flywheel lips protruding into the driven plate groove, a groove formed in the seal plate corresponding to the driven plate lips, the driven plate lips protruding into the seal plate lips, and a gap formed between adjacent pairs of the driven plate lips and the flywheel lips defining the fluid flow path, in a torsion free state, the gaps slightly offset and adjacent to the protrusions.

Further purposes and advantages of the invention will be apparent by the following detailed explanation.

DETAILED DESCRIPTION OF THE PREFERRED EMBODIMENTS

Figure 1:
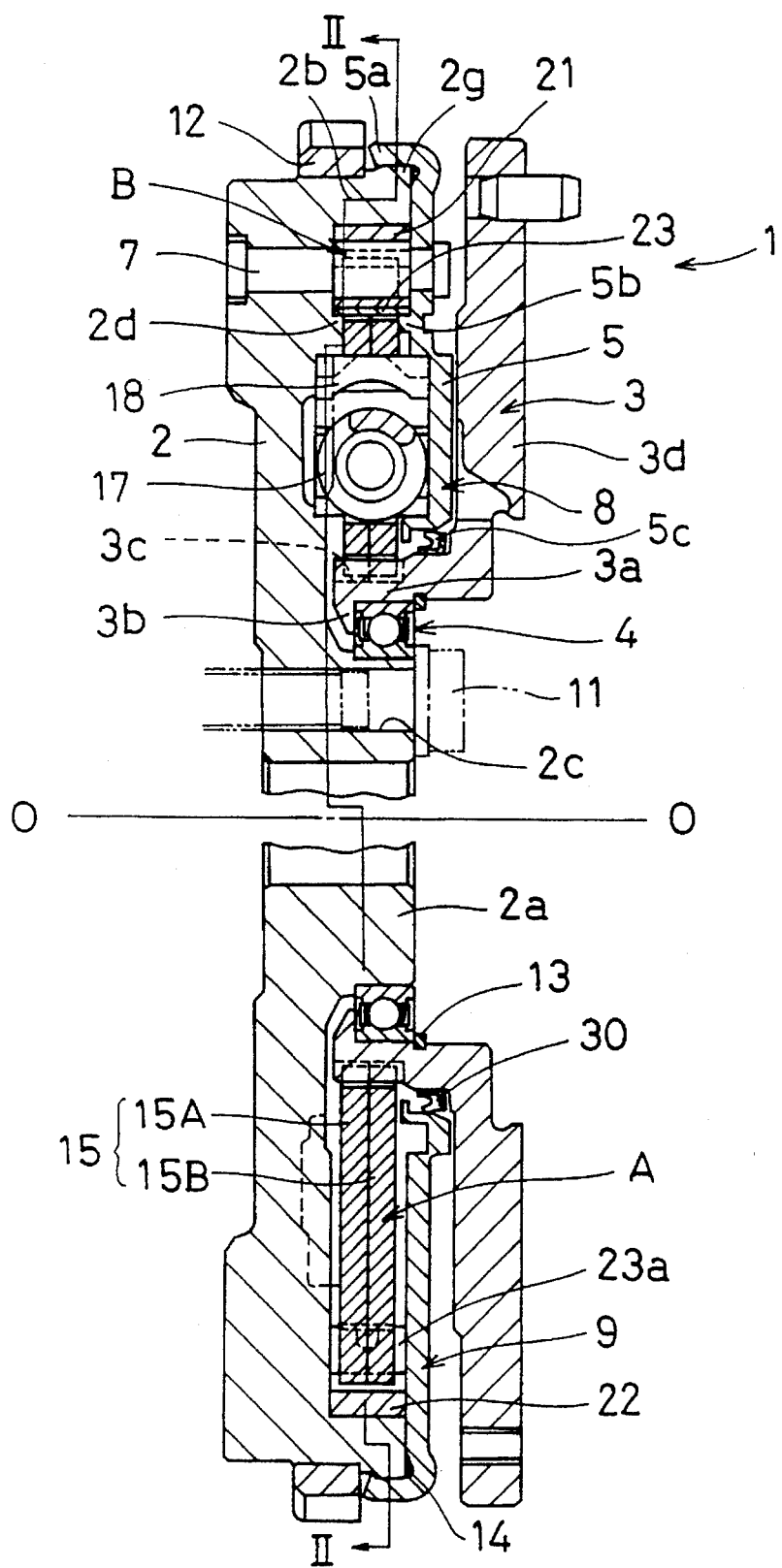
FIG. 1 is a fragmentary, side section of a flywheel assembly in accordance with a first embodiment of the present invention.
Figure 2:
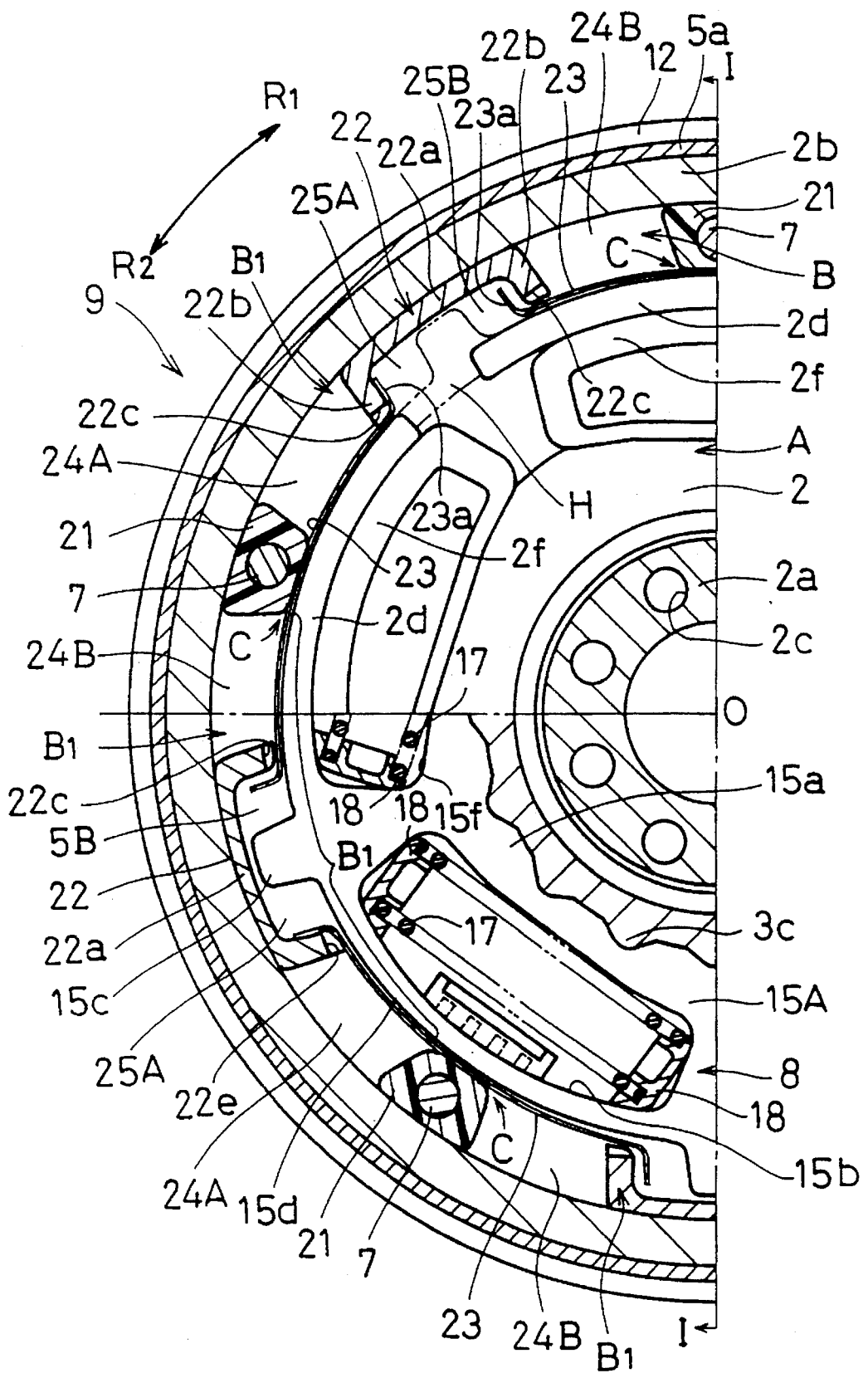
FIG. 2 is a fragmentary section of the flywheel assembly depicted in FIG. 1, taken along the line II—II in FIG. 1.

Objects, features, aspects and advantages of the present invention will become more fully apparent from the following detailed description of the present invention when taken in conjunction with the accompanying drawings where like reference numerals denote corresponding parts throughout.
First Embodiment FIGS. 1 and 2 show a flywheel assembly (1) according to a first embodiment of the present invention. The flywheel assembly (1) is disposed between the engine and transmission of the vehicle and mounted so as to transmit torque from the engine to the transmission. In FIG. 1, the engine is to the left side of the figure, but is not shown in figure and the transmission is to the right side of the figure, but likewise is not shown in figure. Further, the O—O line in FIG. 1 represents the rotational axis line of the flywheel assembly (1) and the direction R1 in FIG. 2 represents the rotation direction of the flywheel assembly (1).

The flywheel assembly (1) mainly includes a first flywheel (2), a second flywheel (3) rotatably mounted to one another via a bearing (4), a driven plate (15) which rotates integrally with the second flywheel (3), an elastic coupling mechanism (8) that elastically connects the first flywheel (2) and the driven plate (15) circumferentially, and a viscous dampening mechanism (9) that dampens torsional vibrations between both flywheels arranged between the first flywheel (2) and the driven plate (15).

The first flywheel (2) is formed generally with a disc shape and has a boss part (2a) and an outer peripheral annular wall (2b) which extends axially toward the second flywheel (3). An annular space (A) is formed between the boss part (2a) and the outer peripheral annular wall (2b). In the center of the boss part (2a) a large diameter center hole is formed and the bearing (4) is mounted at the outer periphery of the boss part (2a). The bearing (4) is fixed at the edge of the boss part (2a) by the head of a bolt (11).

The bolt (11) passes through the hole (2c) formed in the boss part (2a) and fixes the first flywheel (2) to the crankshaft (not shown in figure) of the engine. An annular part (2g) is formed on the annular wall (2b) of the flywheel (2) and extends radially outwardly. Moreover, a ring gear (12) is fixed to the outer periphery of the outer peripheral annular wall (2b) of the first flywheel (2).

The second flywheel (3) is formed in an approximate disc shape and has a boss part (3a) at the center portion. The boss part (3a) protrudes toward the first flywheel (2) and the bearing (4) is mounted to that inner peripheral portion. An annular receiver (3b) provided on the edge of the inner peripheral side of the boss part (3a) makes contact with the bearing (4) on the engine side while snap ring (13) mounted on the inner peripheral side of the boss part (3a) makes contact with the bearing (4). The bearing (4) is a lubricating agent sealed type and seals the inner peripheral portion of the annular space (A), which is described below, between the boss parts (2a, 3a). As shown in FIG. 2, in the boss part (3a), wave-like teeth (3c) are formed that couple with corresponding wave-like teeth in the driven plate (15). Further, the axial face of the second flywheel (3) adjacent to the transmission includes a friction surface (3d) that contacts a friction clutch disk (not shown in figure).

On one side of the second flywheel (3), a disk-shaped seal plate (5) is fixed. The outer peripheral edge of the seal plate (5) includes a caulking portion (5a) which is caulked to encapsulate the annular part (2g) of the outer peripheral annular wall (2b) of the first flywheel (2). A seal material (14) is arranged between the caulk portion (5a) and the outer peripheral annular wall (2b). In this way, the outer peripheral portion of the seal plate (5) is caulked to the outer peripheral portion of the first flywheel (2) which makes possible the omission of a flange typically formed on a conventional first flywheel. Consequently, not only the first flywheel (2) but also the outside diameter of the flywheel assembly can be made smaller. Moreover, the seal plate (5) is fixed to the first flywheel (2) by a plurality of rivets (7) arranged circumferentially in equal intervals. The seal plate (5) further defines the annular space (A) formed between the boss part (2a) and the outer peripheral annular wall (2b) of the first flywheel (2), and which is filled with a viscous fluid such as grease. An annular seal (5c) is arranged between the inner peripheral edge of the seal plate (5) and the outer peripheral surface of the boss part (3a) of the second flywheel (3) for the purpose of sealing the annular space (A).

The driven plate (15) is a disc-shaped material that includes a pair of driven plates (15A, 15B) which are arranged inside the annular space (A). As shown in FIG. 2, the driven plate (15) has wave-like inner teeth on the inner peripheral edge. These wave-like inner teeth (15a) mesh with the wave-like outer teeth (3c) formed on the second flywheel (3). This meshing allows the driven plate (15) to rotate integrally with the second flywheel (3). Further, five orifices (15b) are formed extending circumferentially at circumferential intervals on the driven plate (15). On an outer peripheral surface (15d) of the driven plate (15), a plurality of protrusions (15c) protruding radially towards the outside from each orifice (15b) are formed. These protrusions (15c) extend inside a fluid chamber (B) of the viscous dampening mechanism (9) as will be explained below.

The elastic coupling mechanism (8) in the flywheel assembly (1) includes a coil spring (17) extending circumferentially and a sheet material (18) disposed at each end of the coil spring (17). The coil spring (17) and the sheet material (18) are arranged inside the orifices (15b) of the driven plate (15). Further, on a surface of the first flywheel (2), a spring bearing channel (2f) is formed that corresponds to the orifices (15b) of the driven plate (15). Each end of the sheet material (18) is contactable with the circumferential edges of the spring bearing channel (2f) and corresponding orifice (15b). In this way the first flywheel (2) and the driven plate (15) can be circumferentially and elastically connected via the elastic coupling mechanism (8). In the torsion free state, shown in FIG. 2, the sheet material (18) inner peripheral surface only makes contact with the edge of the spring bearing channel (2f) of the first flywheel (2) and the edge of the orifices (15b) of the driven plate (15). That is, the coil spring (17) is housed inside the orifices (15b) in an uneven contact state.

Next, the viscous dampening mechanism (9) will be described.

The viscous dampening mechanism (9) includes an annular fluid chamber (B) which is formed by the first flywheel (2) and the seal plate (5). As shown in detail in FIG. 3, the fluid chamber (B) is partially defined by the inner peripheral surface of the outer peripheral annular wall (2b), and the inner surface of the seal plate (5). Moreover, a plurality of arc-shaped protruding parts (2d) formed by lathe cutting are formed on the outer peripheral side of the spring bearing channel (2f) of the first flywheel (2).

A gap (H) is maintained between each protruding part (2d), as is shown in the upper half of FIG. 2. In the free state shown in FIG. 2, the gap (H) is slightly offset in the R2 direction relative to the protrusion (15c) of the driven plate (15). An inwardly protruding portion (5b) formed on the seal plate (5) corresponds to the protruding portion (2d) of the first flywheel (2). The area between the protruding portions (2d, 5b) opens radially toward the inside in the fluid chamber (B) defining an opening (D). The protruding portion (2d) of the first flywheel (2) and the outer peripheral surface of the protruding portion (5b) of the seal plate (5) are generally aligned with one another.

Figure 4:
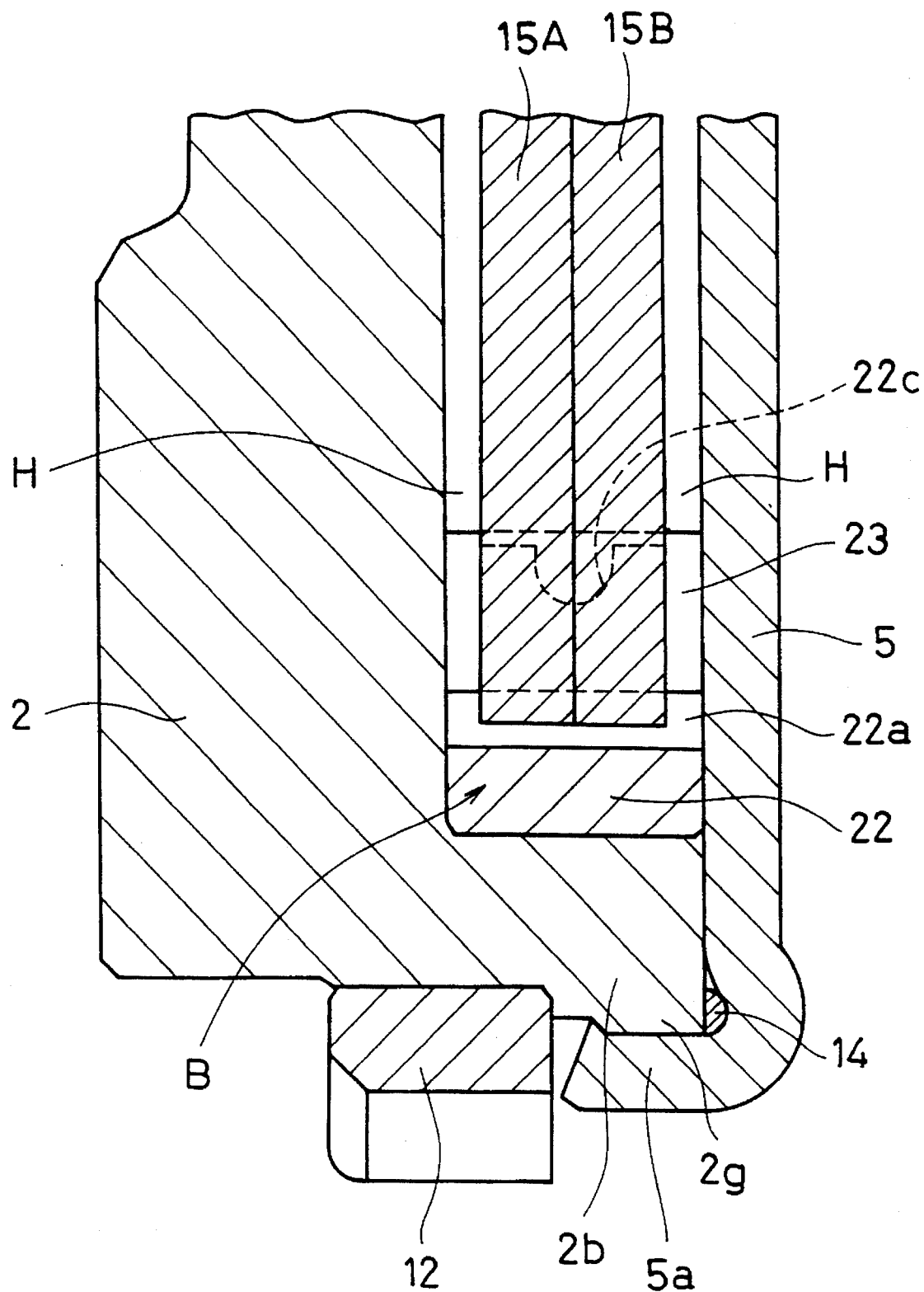
FIG. 4 is a fragmentary view of another portion of FIG. 1 on an enlarged scale.

The outer peripheral surface (15d) of the driven plate (15) narrows between the protruding portion (2d) and the protruding portion (5b). A very small gap is formed between both outer peripheral surfaces of the driven plate (15) and the protruding portions (2d, 5b). Further, the return hole (H) (FIG. 4) allows viscous fluid to flow freely between the fluid chamber (B) and the annular space (A). The outer peripheral surface (15d) has a diameter shorter than the outer peripheral diameter of the protruding portion (2d) and the protruding portion (5b). Further, the protrusion (15c) of the driven plate (15) extends into the fluid chamber (B).

Five stoppers (21) are arranged at radial intervals circumferentially inside the fluid chamber (B). The stoppers (21) are blocks made from a rubber or resin material and each has a hole through which a rivet (7) extends.

The stoppers divide the annular fluid chamber (B) into five arc-shaped fluid chambers (B1) (FIG. 2). Each protrusion (15c) of the driven plate (15) extends into one of the arc-shaped fluid chambers (B1). Within each arc-shaped fluid chamber (B1) a covered-cap-shaped slide stopper (22) is disposed, such that each covered-cap-shaped slide stopper (22) covers one of the protrusions (15c) of the driven plate (15). The slide stopper (22) has an outer peripheral portion (22a) with an arc-shaped surface corresponding to the inner peripheral surface of the outer peripheral annular wall (2b) of the first flywheel, and stopper portions (22b) that extend radially inwardly from each end of the outer peripheral portion (22a). Because this slider stopper (22) does not have a conventional side face part, it can be removed from the protrusion (15c) in the axial direction.

The outer peripheral portion (22a) and the stopper portions (22b) of the slider stopper (22) make contact with the first flywheel (2) and the inner surface of the seal plate (5), respectively. Under these conditions, the slide stopper (22) can circumferentially move freely within each arc-shaped fluid chamber (B1). The slide stopper (22) is therefore displacable until the stopper portion (22b) makes contact with the protrusion (15c) relative to the protrusion (15c) of the driven plate (15). Further, a notch (22c) is formed on the inner radial edge of the stopper portion (22b).

Figure 5:
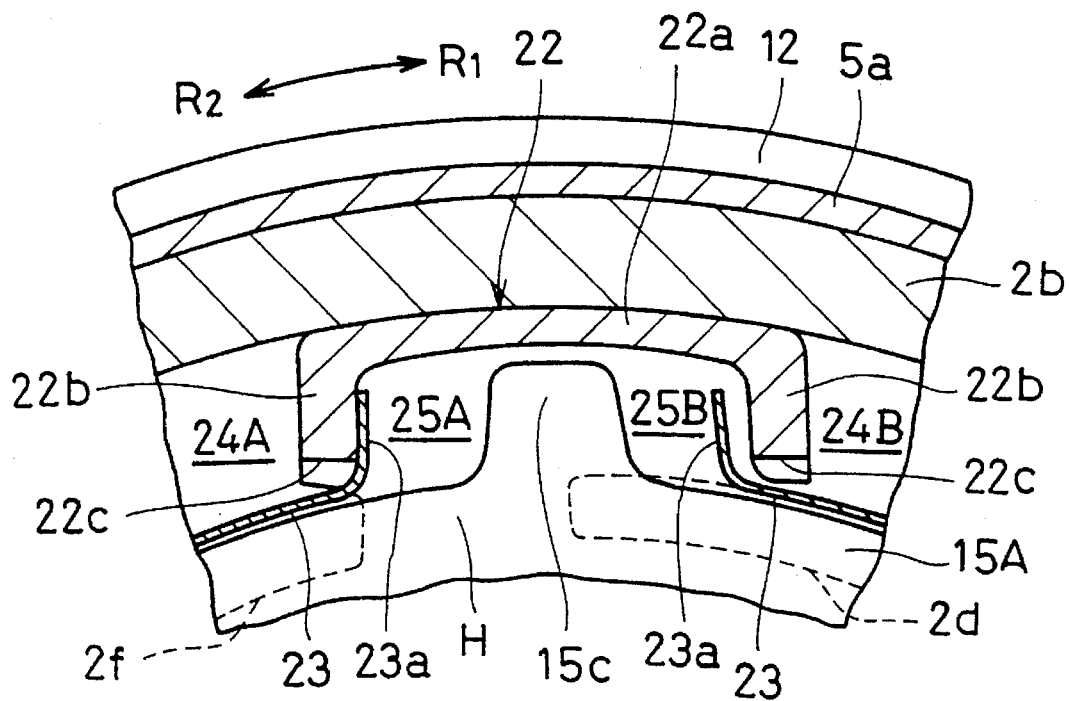
FIG. 5 is a fragmentary view of a portion of FIG. 2 on an enlarged scale showing portions of the fluid dampening mechanism in a displacement free state.

As is shown in FIGS. 2 and 5, the slide stopper (22) divides the inside of each arc-shaped fluid chamber (B1) into a large chamber (24A) in the R2 direction and a large chamber (24B) in the R1 direction. Further, the inside of the slide stopper (22) is divided into a small chamber (25A) in the R2 direction and a small chamber (25B) in the R1 direction by the protrusion (15c) of the driven plate (15). However, viscous fluid can freely flow back and forth between the small chamber (25A) and the small chamber (25B) due to a gap formed between the protrusion (15c) of the driven plate (15), the first flywheel (2) and the seal plate (5).

Figure 3:
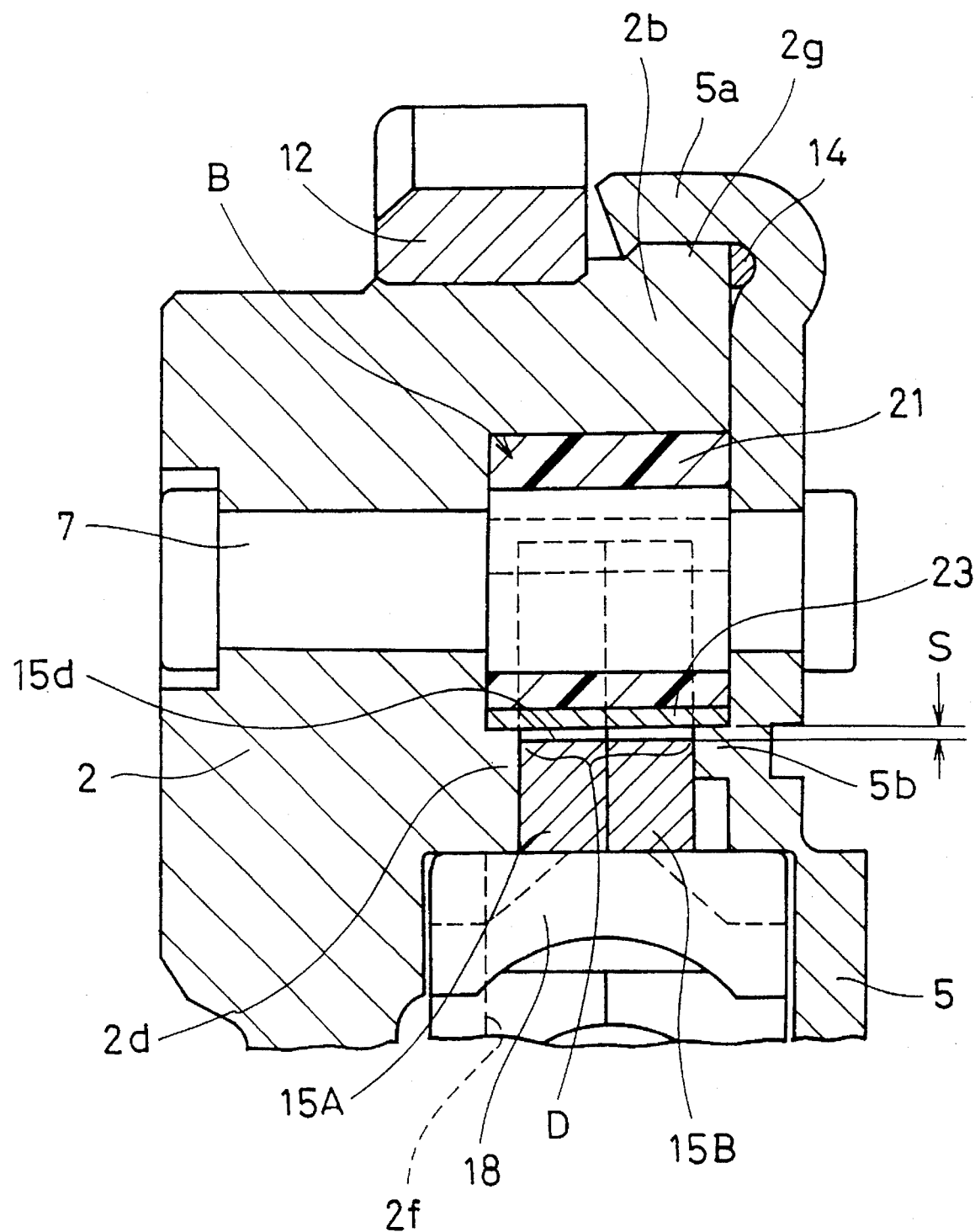
FIG. 3 is a fragmentary view of a portion of FIG. 1 on an enlarged scale.

Seal material (23) is arranged crossing over the large chamber (24B) of the one arc-shaped fluid chamber (B1) and the inside of the large chamber (24A) of the adjacent arc-shaped fluid chamber (B1). The seal material (23) is formed from a thin plate-like material and contacts with the outer peripheral surface of the protruding portion (2d) of the first flywheel (2) and the outer peripheral surface of the protruding portion (2d) of the seal plate (5), as is shown in FIG. 3. Further, as shown in FIG. 3, a gap (S) is formed between the inner radial surface of the seal plate (23) and the outer peripheral surface (15d) of the driven plate (15). On each end of the seal material (23) curved parts (23a) are formed, such that each curved part (23a) is bent radially outwardly from the plate-like main portion of the seal material (23). Each curved part (23a) is arranged between the protrusion (15c) and the stopper portion (22b) of the slide stopper (22). In the torsion free state shown in FIG. 2, the curved part (23a) in the R2 direction makes contact with the stopper portion (22b) and the curved part (23a) in the R1 direction is spaced apart from the stopper portion (22b) and has been moved apart the protrusion (15c). In this way, the circumferential length of the seal material (23) is generally determined to be longer than the distance between adjacent stopper portions (22b) of slide stoppers (22).

A choke (C) is formed between the inner peripheral surface the stopper (21) and the outer peripheral surface of the seal material (23). When viscous fluid flows through this choke (C), a large viscous resistance is generated.

Next, the operation will be explained.

When torque is input from the crankshaft on the engine to the first flywheel (2), that torque is transmitted to the driven plate (15) via the coil spring (17) and then transmitted to the second flywheel (3). The torque of the second flywheel (3) is transmitted to the transmission side via the clutch disk (not shown in figures).

Figure 6:
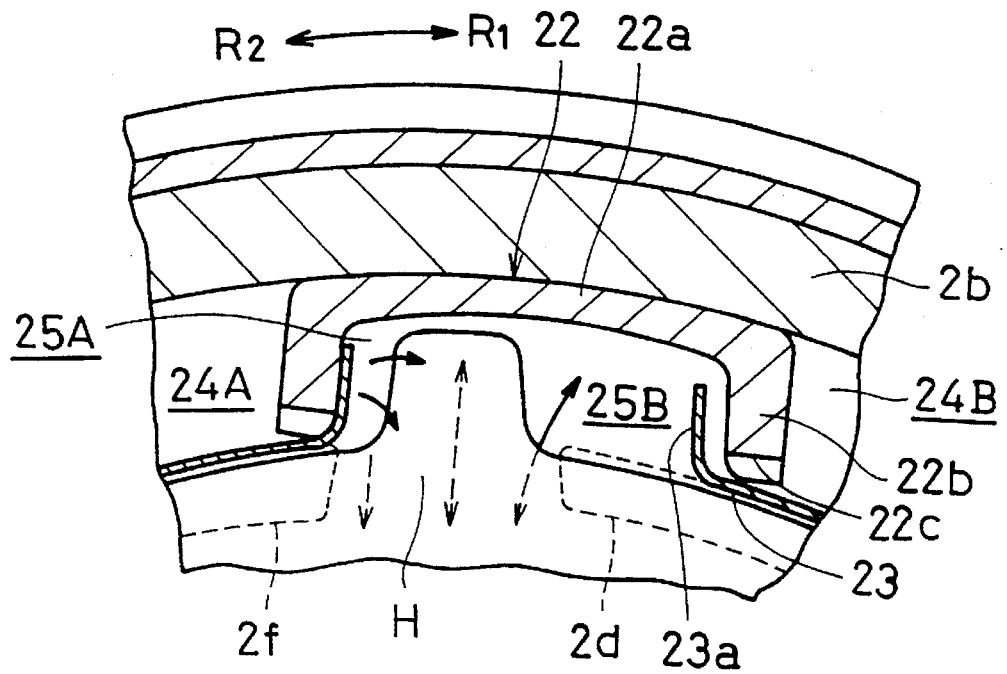
FIG. 6 is a fragmentary view similar to FIG. 5, showing relative displacement of portions of the fluid dampening mechanism.
Figure 7:
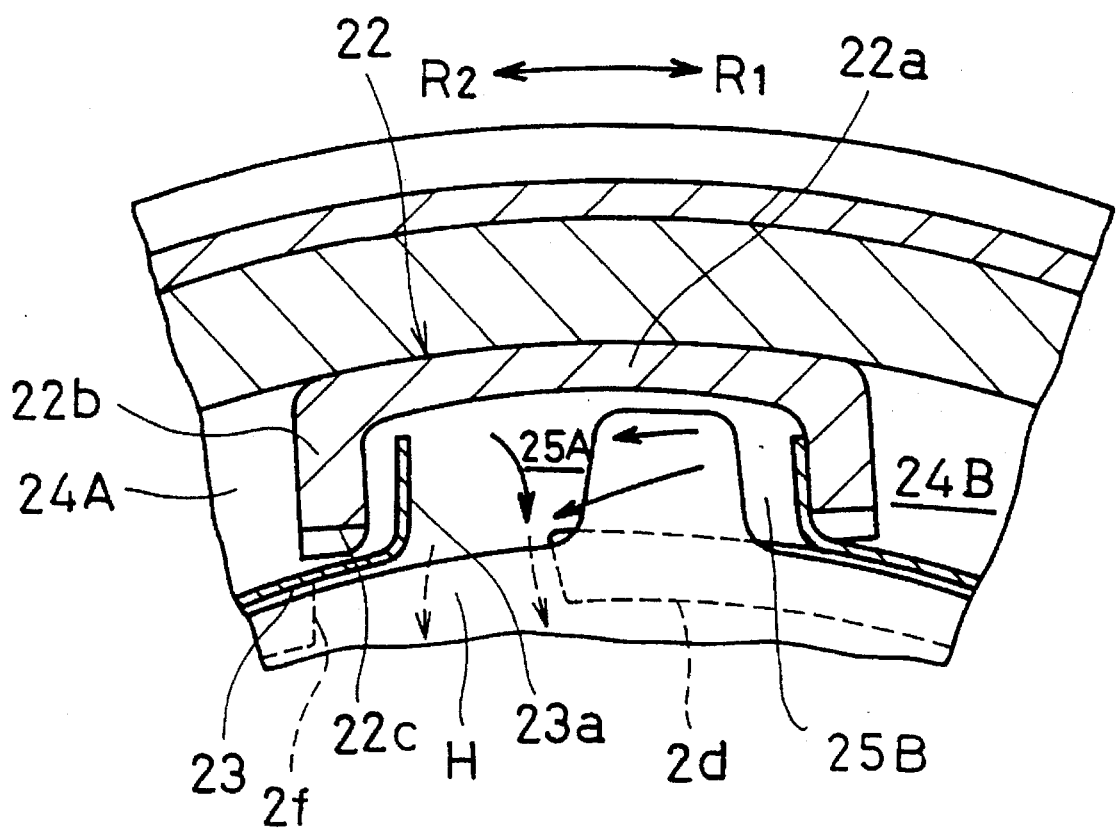
FIG. 7 is a fragmentary view similar to FIGS. 5 and 6 showing further relative displacement of portions of the fluid dampening mechanism.

In the event that uneven torque is transmitted through the flywheel assembly (1) due to fluctuations in engine speed or to operator mistakes, vibrations may be transmitted to the flywheel assembly (1). In the event that the vibrations are generally small, the stopper portion (22b) of the slide stopper (22) may not make contact with the protrusion (15c) of the driven plate (15). In this case the displacement of the relatively movable parts in the flywheel assembly is within a small angular displacement range. From the free state shown in FIG. 5, the first flywheel (2) and the seal plate (5) are displaced in the R1 direction. When this occurs, the slide stopper (22) also moves together with the seal material (28) in the R1 direction and, as shown in FIG. 6, the small chamber (25A) contracts and the small chamber (25B) expands inside the slide stopper (22). The viscous fluid freely flows from the small chamber (25A) to the small chamber (25B). Further, the viscous fluid can freely flow back and forth through the return hole (H) between the small chambers (25A, 25B) and the annular space (A). The viscous fluid returns to the neutral state shown in FIG. 5 from the state shown in FIG. 6 and then the first flywheel (2) may be further displaced in the R2 direction. When this occurs, initially the stopper portion (22b) of the slide stopper (22) makes contact with the curved part (23a) of the seal material (23). At the same time, the small chamber (25B) contracts and the small chamber (25A) expands. During this time also, the viscous fluid can freely flow back and forth between the small chamber (25A) and the small chamber (25B) as well as freely flow back and forth through the return hole (H) between the small chambers (25A, 25B) and the annular space (A) as is shown in FIG. 7. After the vibrations have been absorbed, the various part return to the state depicted in FIG. 5 due to the spring (17).

When the very small vibrations explained above occur, the coil spring (17) expands and contracts in an uneven state relative to the orifice (15b) of the driven plate (15). Consequently, a low-rigidity state can be obtained. Namely, for very small vibration, low-rigidity and low viscous resistance properties can be obtained and unusual noises such as gear chatter and squeaking noises can be effectively suppressed.

Moreover, during the above operation, the seal material (23) rotates together with the first flywheel (2) and rotates relative to the driven plate (15). Also, since the gap (S) (FIG. 3) is ensured between the seal material (23) and the outer peripheral surface (15d) of the driven plate (15), no frictional resistance generates. This makes it possible to reduce the displacement resistance when very small vibrations occur.

Next, the operation when a torsional vibration (hereinafter referred to as large vibration) with a large displacement angle is transmitted will be explained.

Figure 8:
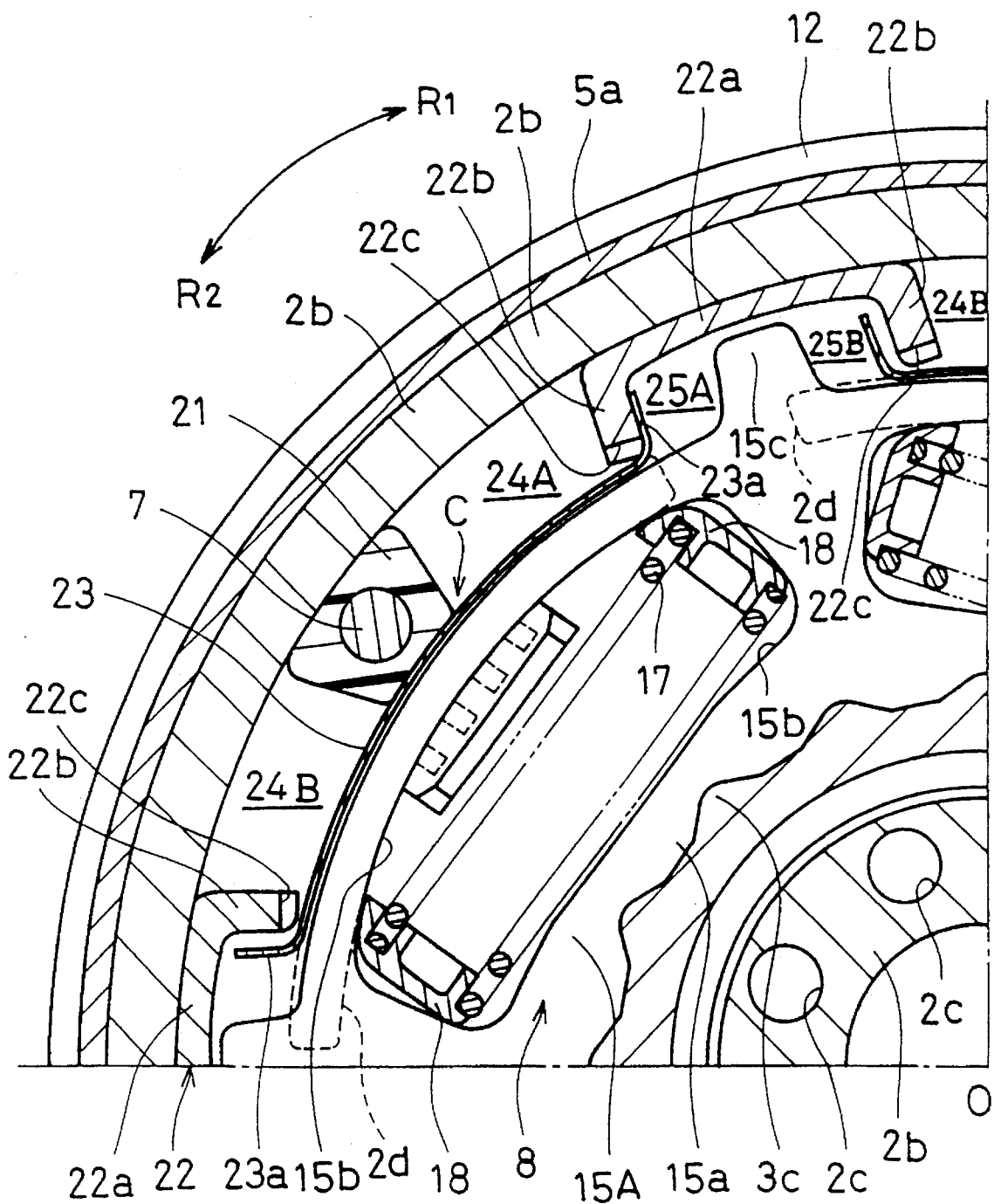
FIG. 8 is a fragmentary view of a portion of FIG. 2 on an enlarged scale.
Figure 9:
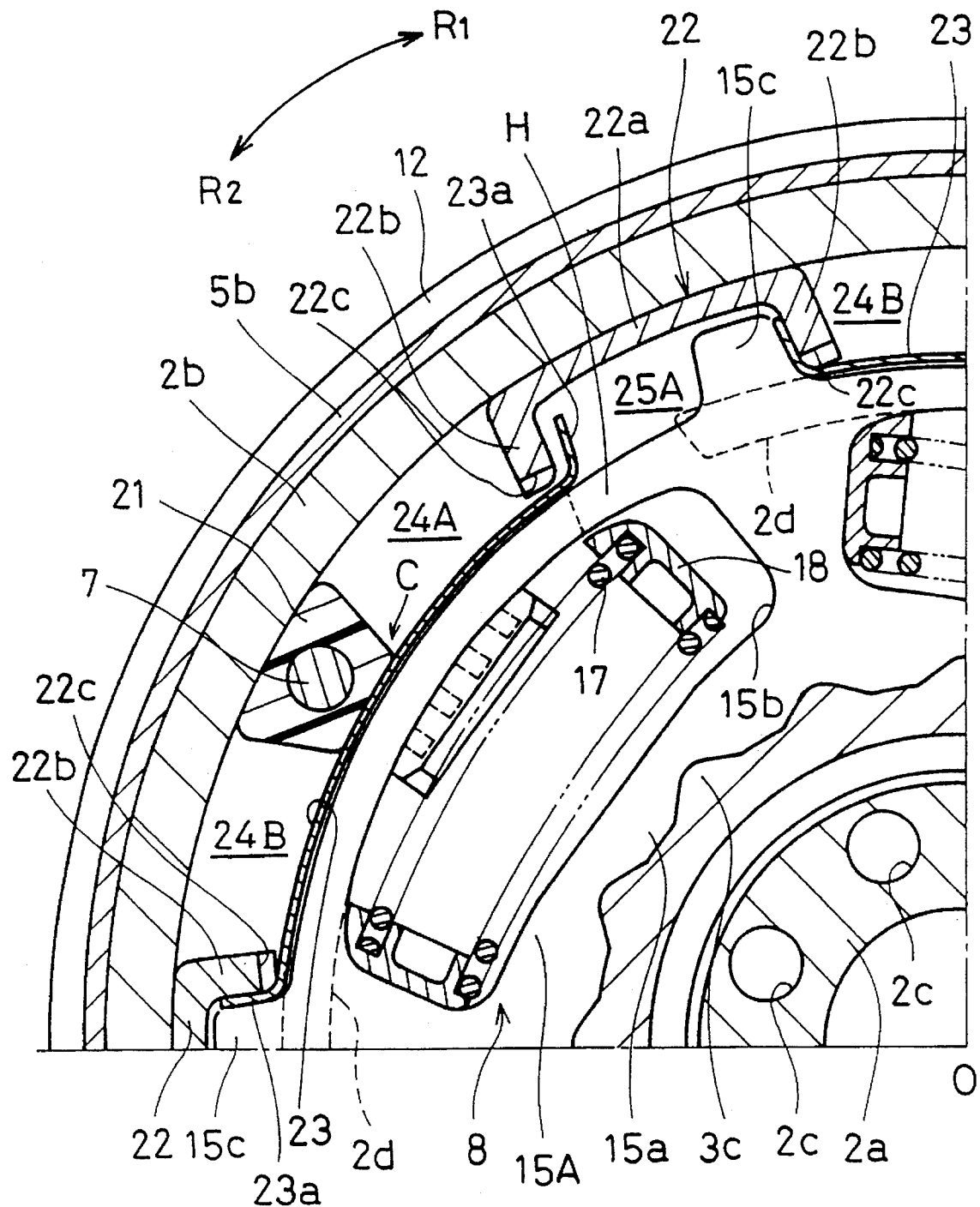
FIG. 9 is similar to FIG. 8 but shows relative displacement of portions of the fluid dampening mechanism and the flywheel assembly.

From the free state shown in FIG. 8, the first flywheel (2) and the driven plate (5) are displaced in the R2 direction relative to the driven plate (15). When this occurs, the slide stopper (22) moves in the R2 direction together with the first flywheel (2). After the stopper portion (22b) makes contact with the curved portion part (23a) of the seal material (23), the slide stopper (22) will continue to move in the R2 direction together with the seal material (23). When this occurs, as shown in FIG. 7, the small chamber (25B) contracts and the small chamber (25A) expands. When the stopper portion (22b) in the R1 direction makes contact with the protrusion (15c) with the space between the curved portion (23a), as shown in FIG. 9, the slide stopper (22) and the seal material (23) become stopped up against the protrusion (15c) of the driven plate (15). When displacement continues in the R2 direction, the small chamber (25B) contracts and the small chamber (25A) expands. During this time, the viscous fluid inside the large chamber (24B) cannot flow to the R2 side due to sealing of the slide stopper (22), the curved part (23a) and the protrusion (15c) and flows through the choke (C) to the large chamber in the R1 direction (arc-shaped fluid chamber (B1) in the R1 direction). When the viscous fluid flows through the choke (C), a large viscous resistance generates. Further, during this time, the seal material (23) radially adheres to the inner side due to pressure occurring inside the large chamber (24B). As a result, the seal material (23) can strongly press against the protruding portion (2d) of the first flywheel and the protruding portion (5b) of the seal plate (5). As a result of that, the sealing properties of the fluid chamber (B) are improved and a large viscous resistance can be ensured as well as friction resistance occurring between the seal material (23) protrusions (2d, 5d).

Figure 10:
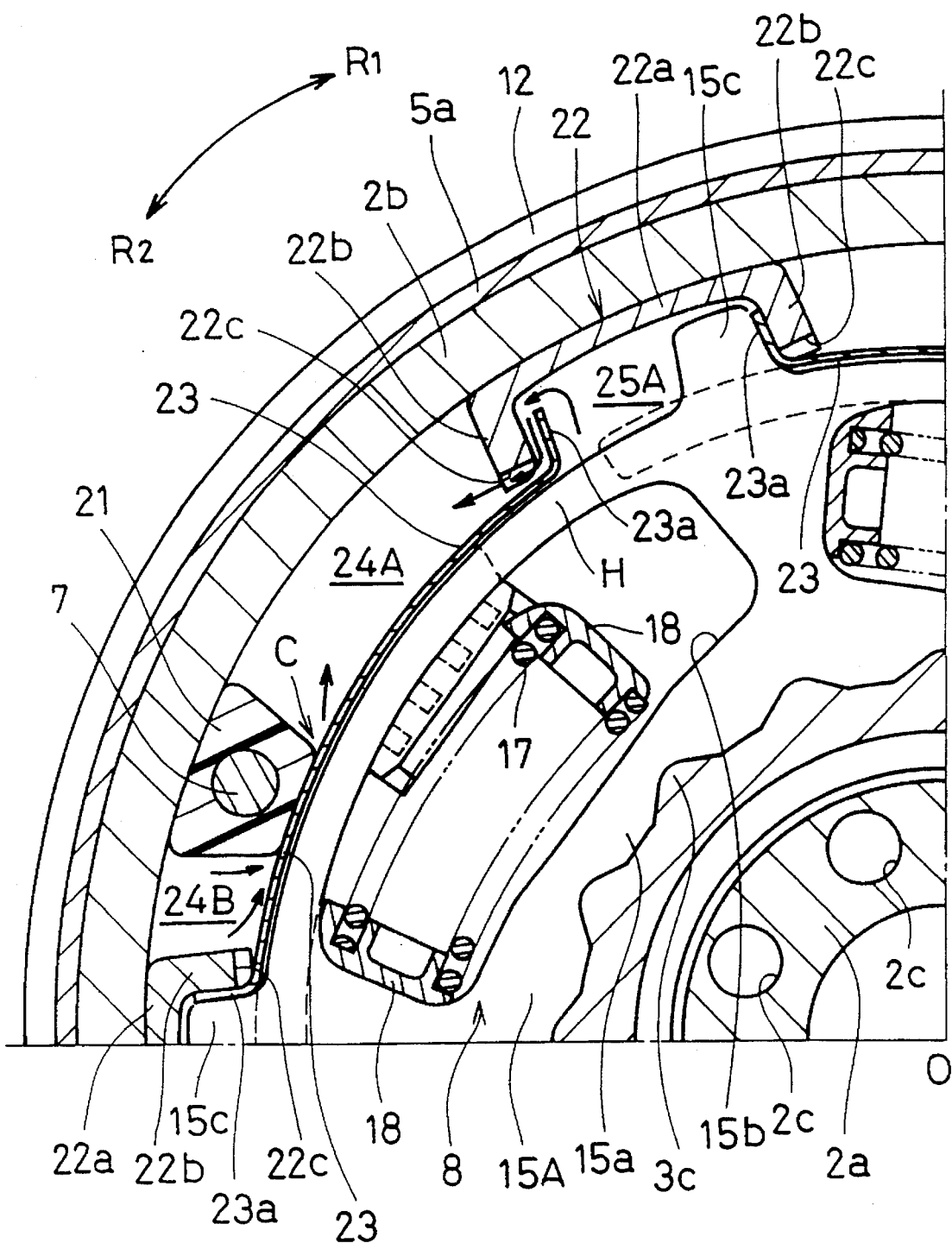
FIG. 10 is similar to FIGS. 8 and 9, showing further relative displacement of portions of the fluid dampening mechanism and the flywheel assembly.

Further, because the seal material (23) is longer than the circumferential length of the two slide stoppers (22), a gap is ensured between the R1 side curved part (23a) of the seal material (23) and the R2 side stopper portion of the slide stopper (22) in the state shown in FIG. 10. Consequently, the viscous fluid can smoothly flow from inside the slide stopper (22) inside the large chamber (244A). From the position shown in FIG. 10, when the first flywheel (2) and the seal plate (5) twist toward the R1 side, they pass the neutral position and operate opposite as shown in FIGS. 8 through 10.

As explained above, during large vibrations a large viscous resistance and a friction resistance can be obtained. Moreover, when the displacement angle becomes large, the sheet material (18) of the coil spring (17) will completely make contact with the edge of the orifice (15b) increasing the rigidity. Basically, during a large vibration, high-rigidity and large resistance can be obtained and vibrations during dip-in/dip-out (large forward and reverse vehicle oscillations occurring when the accelerator pedal is suddenly stepped on) effectively dampened.

As shown in FIG. 10, in a large displacement state, the first flywheel (2) transmits very small vibrations to the R1 side in a fixed angle relative to the driven plate (15). When this occurs, the slide stopper (22) repeatedly twists back and forth relative to the protrusion (15c) within an angle range in which the stopper portion (22b) makes contact with the protrusion (15c). During this time, only a small viscous resistance generates while very small torsional vibrations of the deflection angle can be effectively absorbed. Namely, even if the torsional angle between the first flywheel (2) and the driven plate (15) becomes large, a small viscous resistance relative to torsional vibrations having a small deflection angle can generate.

The following two advantages can be obtained by a construction that omits the conventional fluid chamber housing and driven plate and forms a fluid chamber (B) by the first flywheel (2) and the seal plate (5). The first advantage is simplifying the construction by reducing the number of parts needed to construct the viscous dampening mechanism (9) in the flywheel assembly (1). The second advantage is increasing the cross-sectional area of the annular fluid chamber (B) by 1.5 times. These advantages increase the viscous resistance while the fluid flows through the choke.

Furthermore, because the seal material seals the inner peripheral side of the large chambers (24A, 24B), it is not necessary to form a sealing channel in the driven plate (15).

As a result, it is not necessary to improve the accuracy of the gap of the mating surface of the two driven plates (15A, 15B). Conventionally, if the accuracy of the gap of the mating surface was not improved, viscous fluid would leak from there and a large viscous resistance could not be obtained. Moreover, because the seal material (23) narrows between the protruding parts (2d, 5b) and the stopper (21) and slide stopper (22), even if centrifugal force is applied, deformation and jumping out in the outer radial direction is difficult. Also, in order to create a construction in which the curved part (23a) of the seal material (23) narrows between the protrusion (15c) and the stopper portion (22b) of the slide stopper (22), the sealing performance between the slide stopper (22) and protrusion (15c) during the application of a torsional vibration having a large deflection angle is improved. Even further, by freeing both edges of the seal material (23) from the other material circumferentially, it will function to prevent damage even if deformation due to heat expansion occurs.

Because the caulking portion (5a) of the seal plate (5) is caulked on the outer periphery of the first flywheel, even if pressure is applied to the fluid chamber (B), the seal plate (5) will not separate from the edge of the outer peripheral annular wall. As a result, the sealing properties of the fluid chamber (B) are improved.

Furthermore, by omitting the inner surface of the slide stopper (22), the slide stopper (22) can be easily installed and removed in relation to the protrusion (15c) of the driven plate (15) during assembly or dismantling. Also, because the side face of the protrusion (15c) does not rub on the slide stopper (22), the machining process of the protrusion (15c) normally required is not necessary and the driven plate (15) can be manufactured by only a press process.

In the state before mounting the seal plate (5) to the first flywheel (2), a cylindrical part is formed extending toward the engine in the outer peripheral portion of the seal plate (5). With the annular part (2g) of the first flywheel (2) covered, this cylindrical part carries out roll caulking using a caulking device. As a result, the cylindrical part curves to encapsulate the annular part (2g) and becomes the caulking portion (5a).

Second Embodiment

Figure 11:
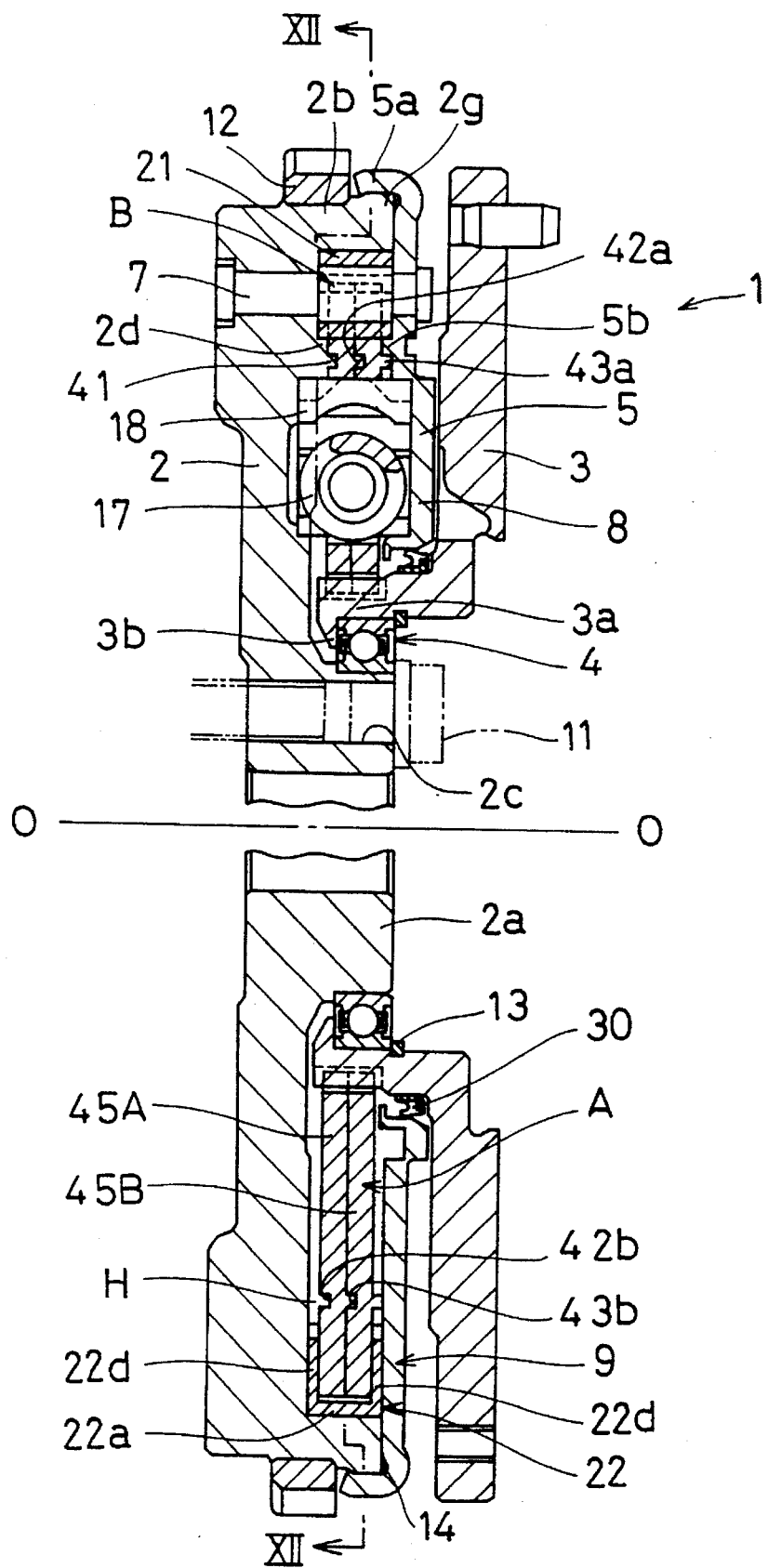
FIG. 11 is a fragmentary, side section of a flywheel assembly, similar to FIG. 1, in accordance with a second embodiment of the present invention.
Figure 12:
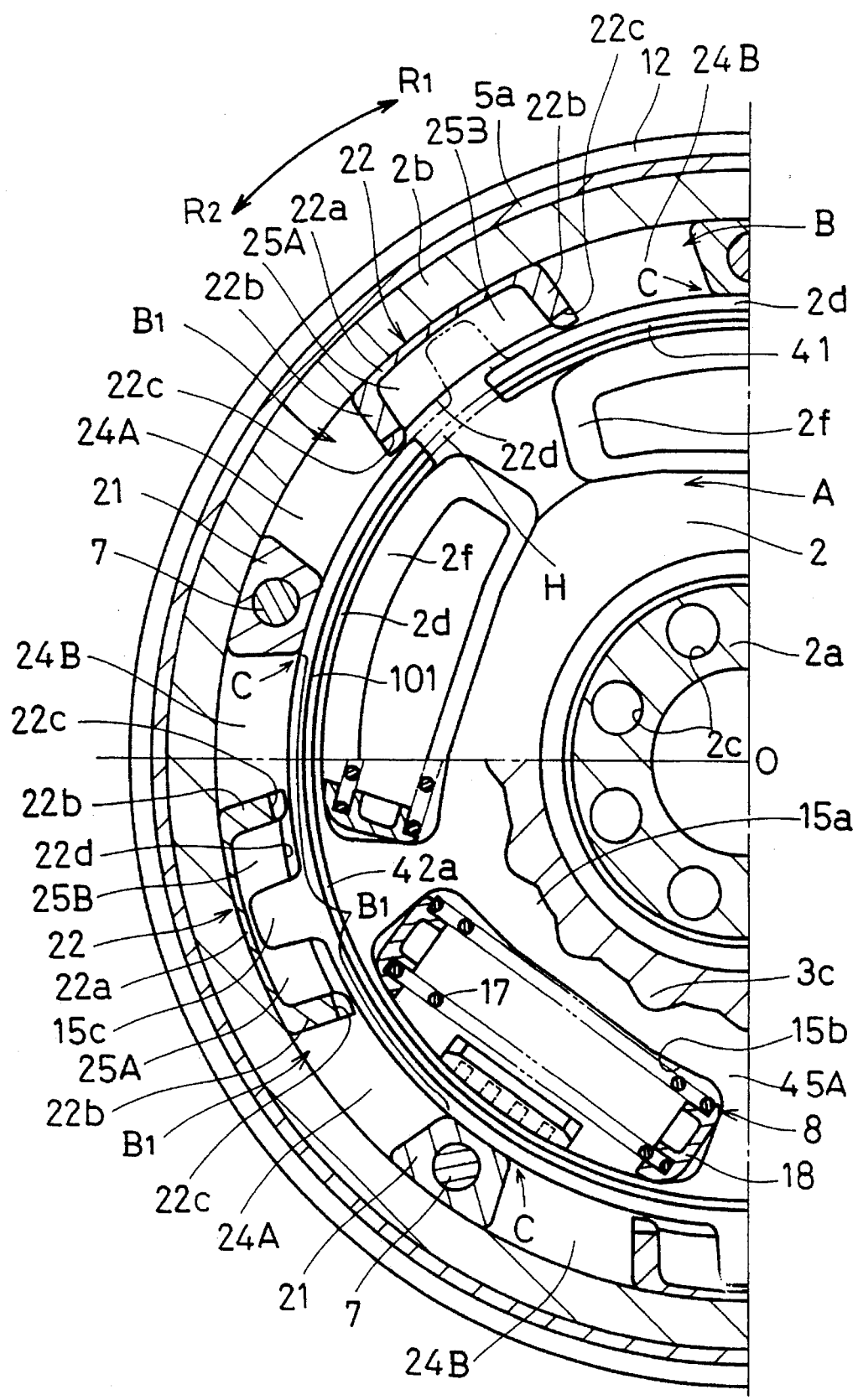
FIG. 12 is a fragmentary section of the flywheel assembly depicted in FIG. 11, taken along the line XII—XII in FIG. 11.
Figure 13:
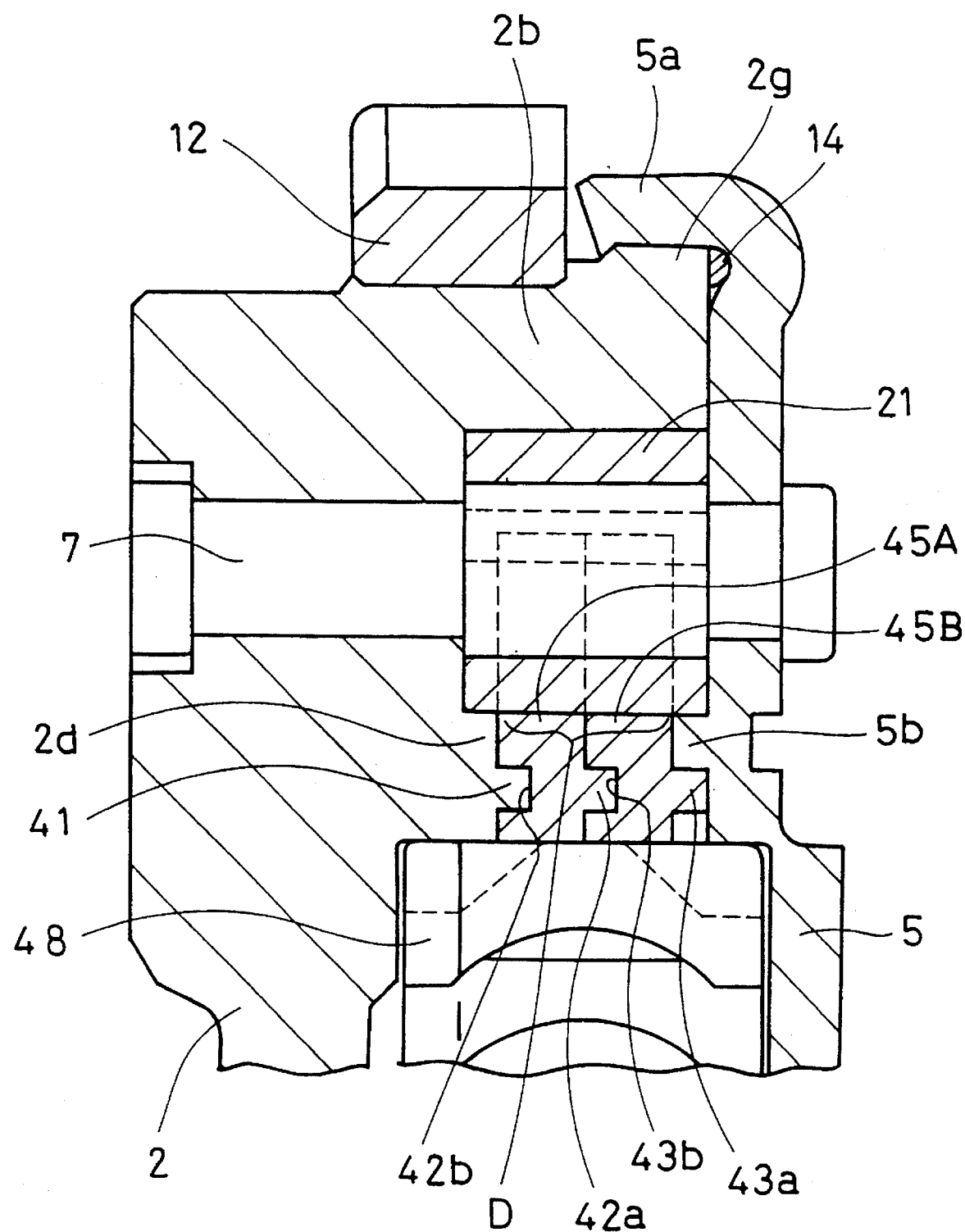
FIG. 13 is a fragmentary section of a portion of FIG. 11 on an enlarged scale.

A second embodiment of the present invention is shown in FIGS. 11 to 13. Many elements in the second embodiment are the same or are similar in construction to the first embodiment, and therefore discussion of common elements is omitted and mainly only those elements that differ are described below.

Each of the slide stoppers (22) includes inner walls (22d) that make contact with the side surfaces of the protrusion (15c) as is best shown in the lower half of FIG. 11.

An annular protrusion (41) is formed by lathe cutting on the protruding portion (2d). Further, in the pair of plates (45A, 45B) making up the driven plate (15), an irregular portion is formed that is made by press process at a position corresponding to the protrusion (41). Namely, an annular protrusion (42a) and an annular groove (42b) are formed in the first driven plate (45A). Moreover, an annular protrusion (43a) and an annular groove (43b) are formed in the second driven plate (45B). The annular protrusion (42a) of the first driven plate (45A) is entrapped in the annular groove (43b) of the second driven plate (45B). This improves the sealing properties of the mating surface between the first driven plate (45A) and the second driven plate (45B).

The protrusion (41) is entrapped in the annular groove (42b) of the first driven plate (45A). The annular protrusion (43a) of the second driven plate (45B) makes contact with the inner peripheral side of the protrusion (5b) of the seal plate (5). As stated above, the junction between the protrusion and annular space (A) formed in the first flywheel (2), driven plate (45) and the seal plate (5) seal the opening (D) of the annular fluid chamber.

Third Embodiment

Figure 14:
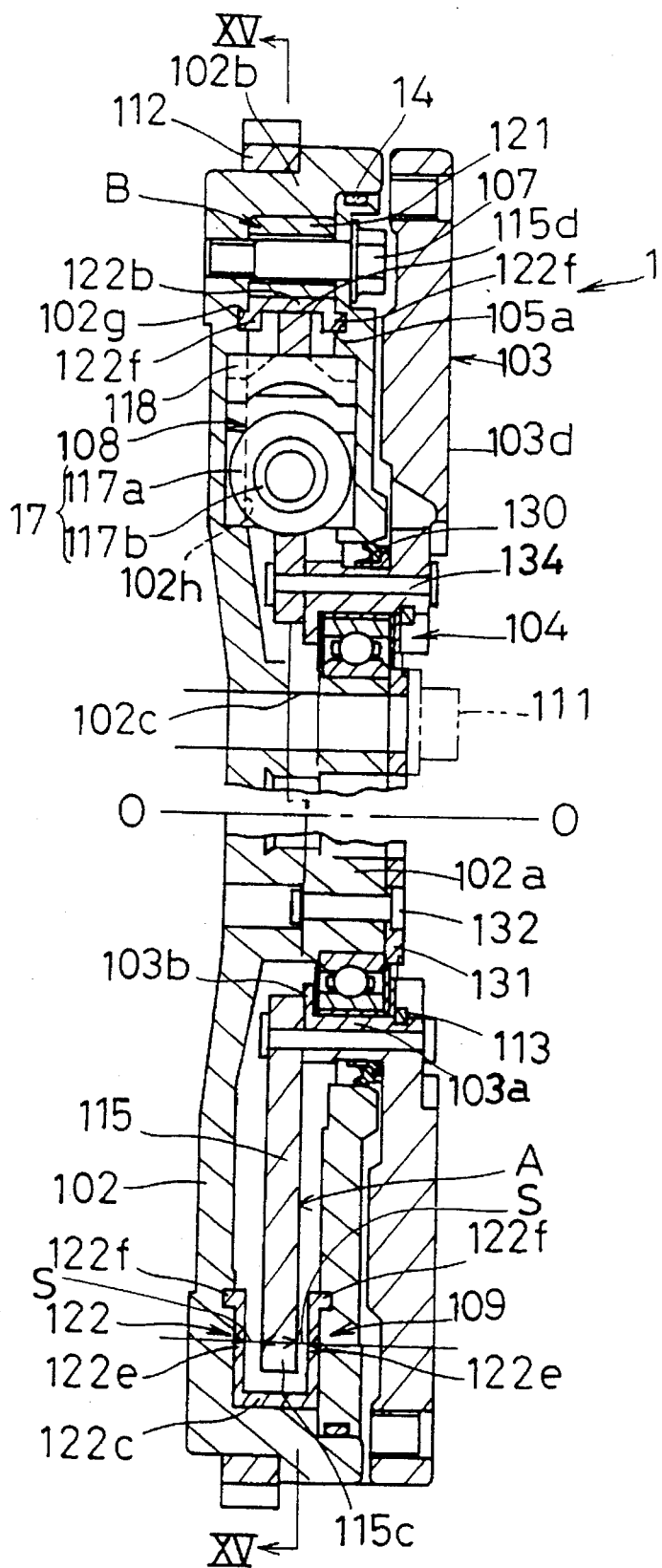
FIG. 14 is a fragmentary, side section of a flywheel assembly, similar to FIGS. 1 and 11, in accordance with a third embodiment of the present invention.
Figure 15:
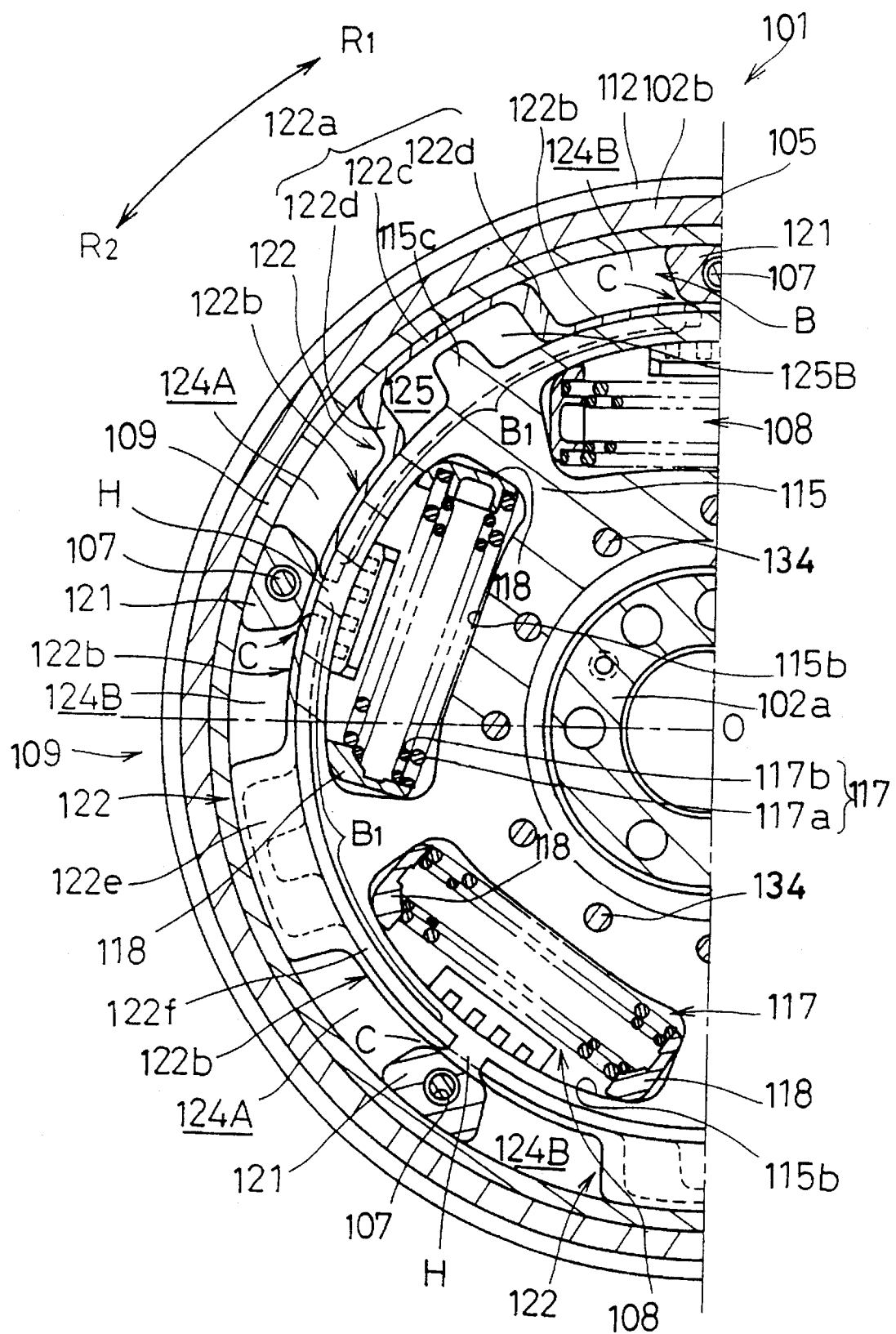
FIG. 15 is fragmentary section of a portion of FIG. 14, taken along the line XV—XV in FIG. 14.
Figure 21:
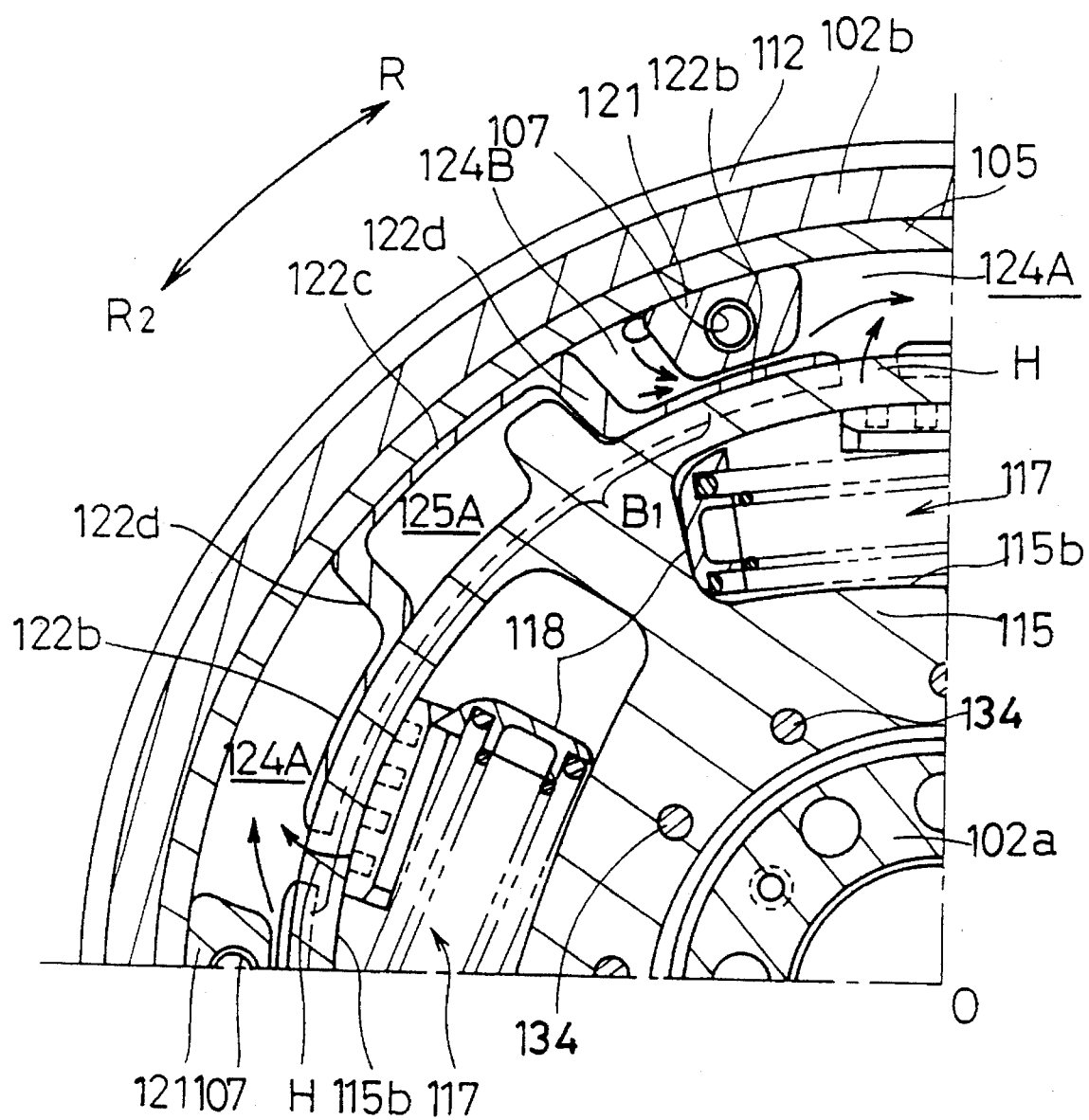
FIG. 21 is similar to FIGS. 19 and 20, showing further relative displacement of portions of the fluid dampening mechanism and the flywheel assembly.

FIGS. 14 and 21 show a flywheel assembly (101) constructed in accordance with a third embodiment of the present invention. In FIG. 14 the engine (not shown in figure) is arranged on the left side of the figure and the transmission (not shown in figure) on the right side. The O—O line in FIG. 14 is a rotation axis line of the flywheel assembly (101) and the R1 direction in FIG. 15 is the rotation direction of the flywheel assembly (101).

The flywheel assembly (101) mainly includes a first flywheel (102), a second flywheel (103) that is supported to freely rotate on the first flywheel (102) via a bearing (104), a driven plate (115) connected to rotate integrally with the second flywheel (103), an elastic coupling mechanism (108) that elastically connects the driven plate (115) and the first flywheel (102) circumferentially and a viscous dampening mechanism (109) to dampen torsional vibrations between the first flywheel (102) and the driven plate (115).

The first flywheel (102) has an approximate disc shape and has a boss part (102a) and an outer peripheral annular wall (102b). An annular space (A) is partially defined between the boss part (102a) and the outer peripheral annular wall (102b). The bearing (104) is mounted at the outer periphery of the boss part (102a). The bearing (104) is fixed at the outer edge surface of the boss (102a) on a retaining plate (131) that is retained by the head of a bolt (111), the bolt extending through the boss part (102a). The retaining plate (131) is fixed to the first flywheel (102) by a rivet (132). The bolt (111) passes through a bolt hole (102c) formed in the boss part (102a) fixing the first flywheel (102) to the crankshaft (not shown in figure).

The second flywheel (103) is a material with an approximate disc shape and has a boss part (103a) located at the center. The boss part (103a) protrudes on the first flywheel (102) side and covers the boss part (102a) of the first flywheel (102). A bearing (104) is mounted at the outer periphery of the boss part (103a). An annular receiver (103b) located on the tip of the inner peripheral side of the boss part (103a) makes contact with the bearing (104) and a snap ring (113) mounted on the inner peripheral side of the boss part (103a) makes contact with the transmission side of the bearing (104). The bearing (104) is a lubricating agent sealed type bearing and seals the inner peripheral portion of the annular space (A), as is described in greater detail below. The boss part (103a) is caulked by at the inner peripheral edge of the driven plate (115) by a plurality of rivets (134). The axial face of the of the second flywheel (103) serves a friction surface (103d) contactable with friction material of a clutch disk (not shown in figure).

On the transmission side of the of the first flywheel (102) a disc-shaped seal plate (105) is fixed. The seal plate (105) is fixed to the the first flywheel (102) by a plurality of bolts (107) arranged circumferentially in equal intervals. The seal plate (105) further defines the annular space (A) between parts of the first flywheel (102) and is filled with a viscous fluid such as grease. An annular seal material (114) is arranged between the outer peripheral surface of the seal plate (105) and the inner peripheral surface of the outer peripheral annular wall (102b). An annular seal material is further arranged between the inner peripheral edge of the seal plate (105) and the outer peripheral surface of the boss part (103a) of the second flywheel (103) for the purpose of sealing the annular space (A).

The driven plate (115) is a disc-shaped material arranged inside the annular space (A). The inner peripheral surface of the driven plate (115) is fixed to the boss part (103a) of the second flywheel (103) by rivets (134). The driven plate (115) can move in an axial direction relative to the second flywheel (103), but cannot move radially due to the rivets (134). A plurality of orifices are formed extending circumferentially at circumferential intervals on the driven plate (115). On the outer peripheral surface (115d) of the driven plate (115), a plurality of protrusions (115c) extend radially outwardly. The driven plate (115) is further provided with a plurality of orifices (115b). The protrusions (115c) extend into a fluid chamber (B) of the viscous dampening mechanism (109) which is explained in greater detail below.

Next, the elastic coupling mechanism (108) will be described.

The elastic coupling mechanism (108) includes a coil spring (117) extending circumferentially and a sheet material (118) arranged at each end of each coil spring (117). Each coil spring (117) and corresponding sheet material (118) are disposed inside the orifices (115b) of the driven plate (115). Each coil spring (117) is made up of a large coil spring (117a) and a small coil spring (117b) arranged inside the large coil spring (117a). Further, on the surface of the first flywheel (102) at the radial midpoint on the transmission side, a spring bearing channel (102h) (FIG. 14) is formed that corresponds to the orifices (115b) of the driven plate (115). One end of the sheet material (118) makes contact with both circumferential edges of the spring bearing channel (102h). In this way the first flywheel (102) and the driven plate (115) become circumferentially and elastically connected via the elastic coupling mechanism (108). In a torsion free state, shown in FIG. 15, the sheet material (118) inner peripheral surface only makes contact with the edge of the spring bearing channel (102h) of the first flywheel (102) and the edge of the orifices (115b) of the driven plate (115). That is, the coil spring (117) is housed inside the spring bearing channel (102h) and the orifices (115b) in an uneven contact state.

Next, the viscous dampening mechanism (109) will be explained.

The viscous dampening mechanism (109) includes an annular fluid chamber (B) which is defined between the first flywheel (102) and the seal plate (105). The fluid chamber (B) is in the outer periphery of the space (A) and is formed between the first flywheel (102), the inner peripheral surface of the outer peripheral annular wall (102b), and the end surface of the seal plate (105).

An annular concave portion (102g) formed by lathe cutting is formed on the outer peripheral side by the spring bearing channel (102h) of the first flywheel (102). In the seal plate (105) an annular concave portion (105a) is also formed by a machining process in the area corresponding to the annular concave portion (102g) of the first flywheel (102). The area between the annular concave portions (102g, 105a) opens radially toward the inside in the fluid chamber (B) and forms an opening (D) that extends circumferentially.

The outer periphery of the driven plate (115) is arranged between the annular concave portions (102g, 105a). Further, the protrusion (115c) of the driven plate (115) is inserted inside the fluid chamber (B). Inside the fluid chamber (B) five stoppers (121) are arranged circumferentially at equal intervals. The stoppers (121) are blocks formed from a rubber or resin material and have a hole through which a bolt (107) extends.

The stoppers (121) divide the annular fluid chamber (B) into five fluid chambers (B1) (FIG. 15). In the center of each fluid chamber (B1) the protrusion (115c) of the driven plate (115) extends. Inside each fluid chamber (B1) a slide stopper (122) is disposed such that each slide stopper (122) partially covers one protrusion (115c) of the driven plate (115).

The slide stopper (122) mainly includes a cap (122a) that covers the protrusion (115c) from the outer peripheral side and two seal portions (122b), each of the seal portions (122b) extending circumferentially from the cap (122a).

The cap (122a) is formed by an outer peripheral portion (122c) which has an arc-shaped surface which conforms to the inner peripheral surface of the outer peripheral annular wall (102b) of the first flywheel (102). The cap (122a) also includes two stoppers (122d) extending radially inwardly from both edges of the outer peripheral portion (122c) toward the seal portions (122b). Further, each cap (122a) includes side faces (122e). Both stoppers (122d) are separated from the protrusion (115c).

The slide stopper (121) is connected to freely move within a specified angle relative to the driven plate (115). As shown in FIG. 14, a large axially oriented gap (S) is ensured between the side face (122e) and the protrusion (115c) of the driven plate (115). The seal (122b) has an arc-shaped surface that matches the outer peripheral surface (115d) of the driven plate (115). A pair of arc-shaped protrusions (122f) which extend circumferentially are formed on opposite sides of the seal (122b) in the axial direction. The arc-shaped protrusions (122f) continue through the inner peripheral sides of each of the side face portions (122d). The arc-shaped protrusion (122f) is inserted into the annular concave portion (102g) of the first flywheel (102) and the annular concave portion (105a) of the seal plate (105). In this state a gap is formed between the seal (102b) and the outer peripheral surface (115d) of the driven plate (115).

Figure 16:
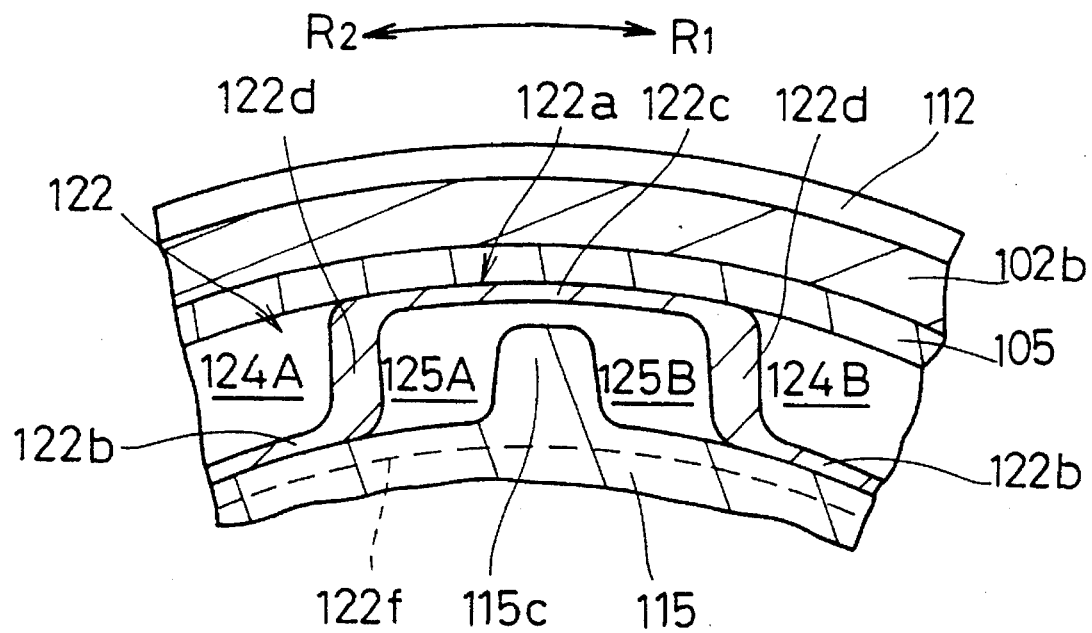
FIG. 16 is a fragmentary view of a portion of FIG. 15 on an enlarged scale showing portions of the fluid dampening mechanism in a displacement free state.

The cap (122a) of the slide stopper (122) divides the inside of each fluid chamber (B1) into a large chamber (124A) on the R2 side and a large chamber (124B) on the R1 side. As is shown in FIG. 16, the inside of the cap (122a) of the slide stopper (122) is divided into a small chamber (125A) on the R2 side and a large chamber (125B) on the R1 side by the protrusion (115c) of the driven plate (115).

A gap (H) is formed between the adjacent seals (122b) of adjacent adjacent slide stopper (122). The gap (H) is a return hole (H) that allows the viscous fluid to flow back and forth between the fluid chamber and the inside of the annular space (A). The area between the outer peripheral surface of the seal (122b) and the stopper (121) defines a choke (C). When viscous fluid flows through this choke (C), a large viscous resistance generates.

Next, the operation of the flywheel assembly will be explained.

When torque is input from the crankshaft of the engine (not shown in figures) to the first flywheel (102), that torque is transmitted to the driven plate (115) via the coil spring (117) and then transmits to the second flywheel (103). The torque of the second flywheel (103) is transmitted to the transmission via a clutch disk (not shown in figures).

Next, operation when torsional vibrations are transmitted from the engine to the first flywheel (102) will be explained. First, the operation when small levels of torsional vibration are transmitted will be explained.

The stopper portion (122b) of the slide stopper (122) does not make contact with the protrusion (115c) of the driven plate (115) when the flywheel assembly experiences small levels of torsional vibration. Small levels of torsional vibration cause small angular displacement of the first flywheel (102) with respect to the driven plate (115).

Figure 17:
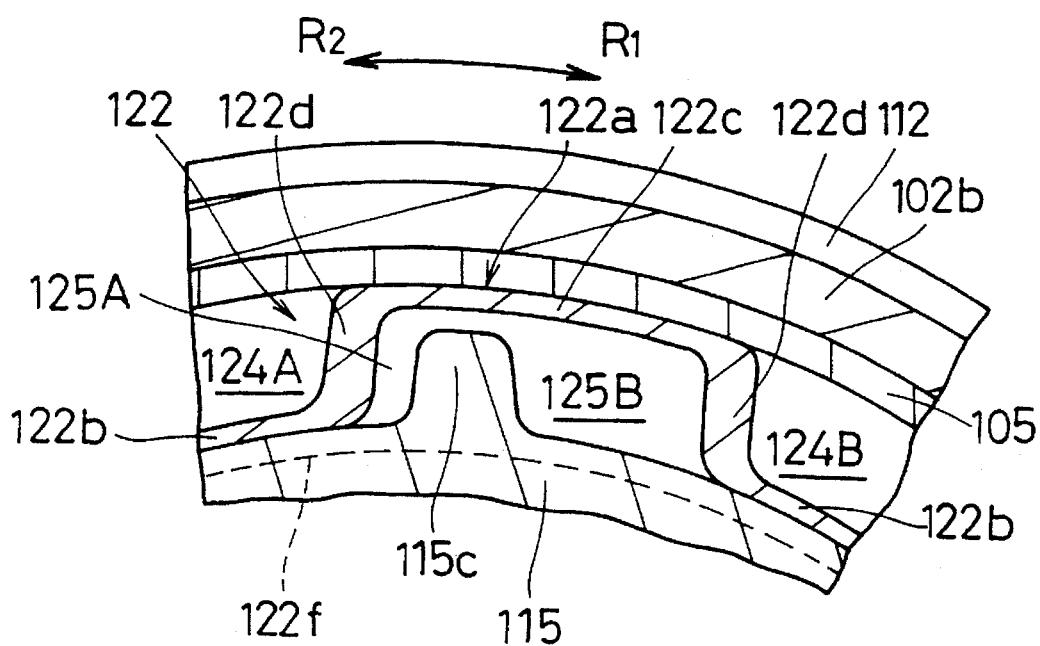
FIG. 17 is a fragmentary view similar to FIG. 16, showing relative displacement of portions of the fluid dampening mechanism.

From the torsion free state shown in FIG. 16, the first flywheel (102) and the seal plate (105) are displaced in the R1 direction. When this occurs, the slide stopper (122) moves together with the first flywheel (102) in the R1 direction. As a result, as shown in FIG. 17, the small chamber (125A) contracts and the small chamber (125B) expands inside the slide stopper (122). During this time, the viscous fluid inside the small chambers (125A, 125B) can pass through the gap between the slide stopper (122) and the driven plate (115) and flow into the inside of the annular space (A). In contrast to that, the viscous fluid inside the annular space (A) can flow into the slide stopper (22).

Figure 18:
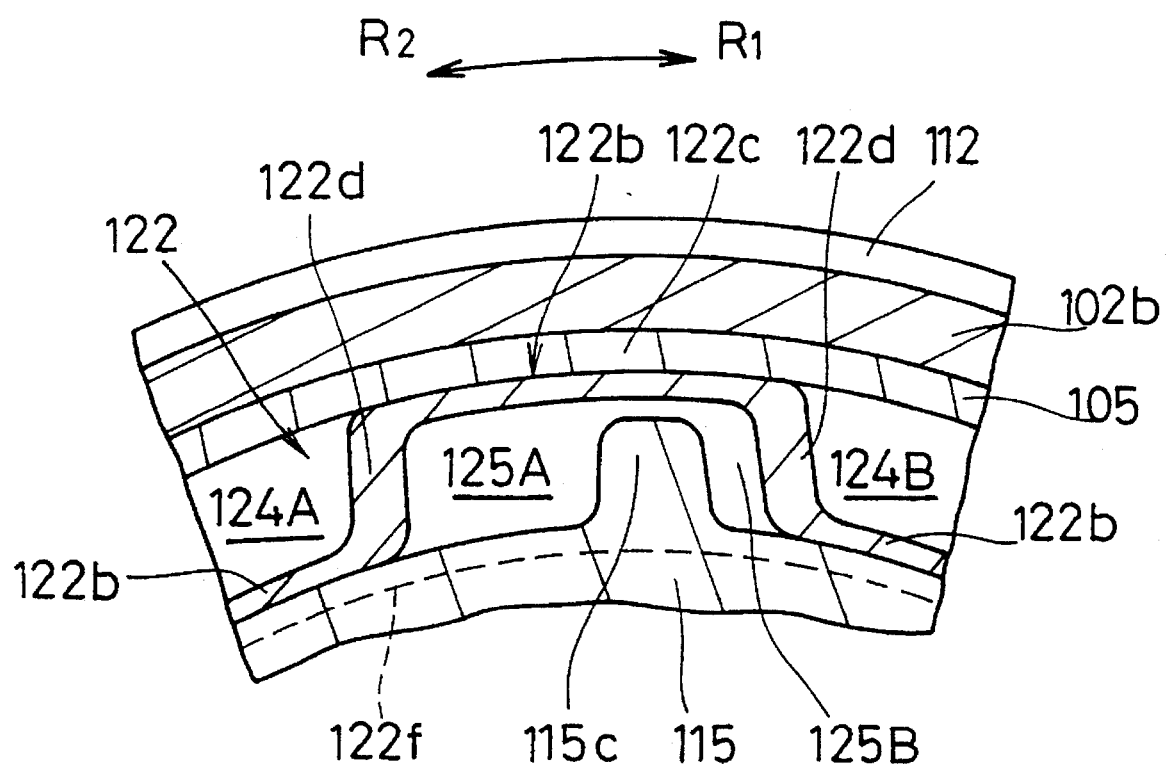
FIG. 18 is a fragmentary view similar to FIGS. 16 and 17 showing further relative displacement of portions of the fluid dampening mechanism.

The viscous fluid returns to the neutral state shown in FIG. 16 from the state shown in FIG. 17 and then the first flywheel (102) may be displaced in the R2 direction. When this occurs, the slide stopper (122) moves together with the first flywheel (102) in the R2 direction, and, as shown in FIG. 18, the small chamber (125B) contracts and the small chamber (125A) expands.

When very small vibrations are experienced, as described above, the viscous fluid does not flow through the choke (C) and large viscous resistance forces are not generated so the slide stopper (122) rotates integrally with the first flywheel (102). Further, because a seal channel on the driven plate (115) is not necessary, the generation of friction resistance between the material on the input side (first flywheel (102), seal plate (105)) and the driven plate (115) during very small vibrations becomes difficult.

Specifically, because a gap is ensured between the outer peripheral surface (115d) of the driven plate (115) and the seal (122b) of the slide stopper (122), and a large axially oriented gap (S) is ensured between both side faces of the outer peripheral portion of the driven plate (115) and the side face (122e) of the driven plate (115), the slide stopper (122) and the driven plate (115) repeat a relative displacement action eliminating friction resistance between both when a torsional vibration having a small deflection angle occurs.

Moreover, for this case, the coil spring (117) expands and contracts in an uneven state relative to the orifice (115b) of the driven plate (115) allowing a low-rigidity state to be obtained. Namely, for very small vibrations, low-rigidity and low resistance properties can be obtained and unusual noises such as gear chatter in the transmission and squeaking noises can be effectively suppressed.

Next, the operation of the flywheel assembly is described when a a relatively large torsional vibration is experienced by the flywheel where a generally large displacement of relatively movable parts is experienced.

Figure 19:
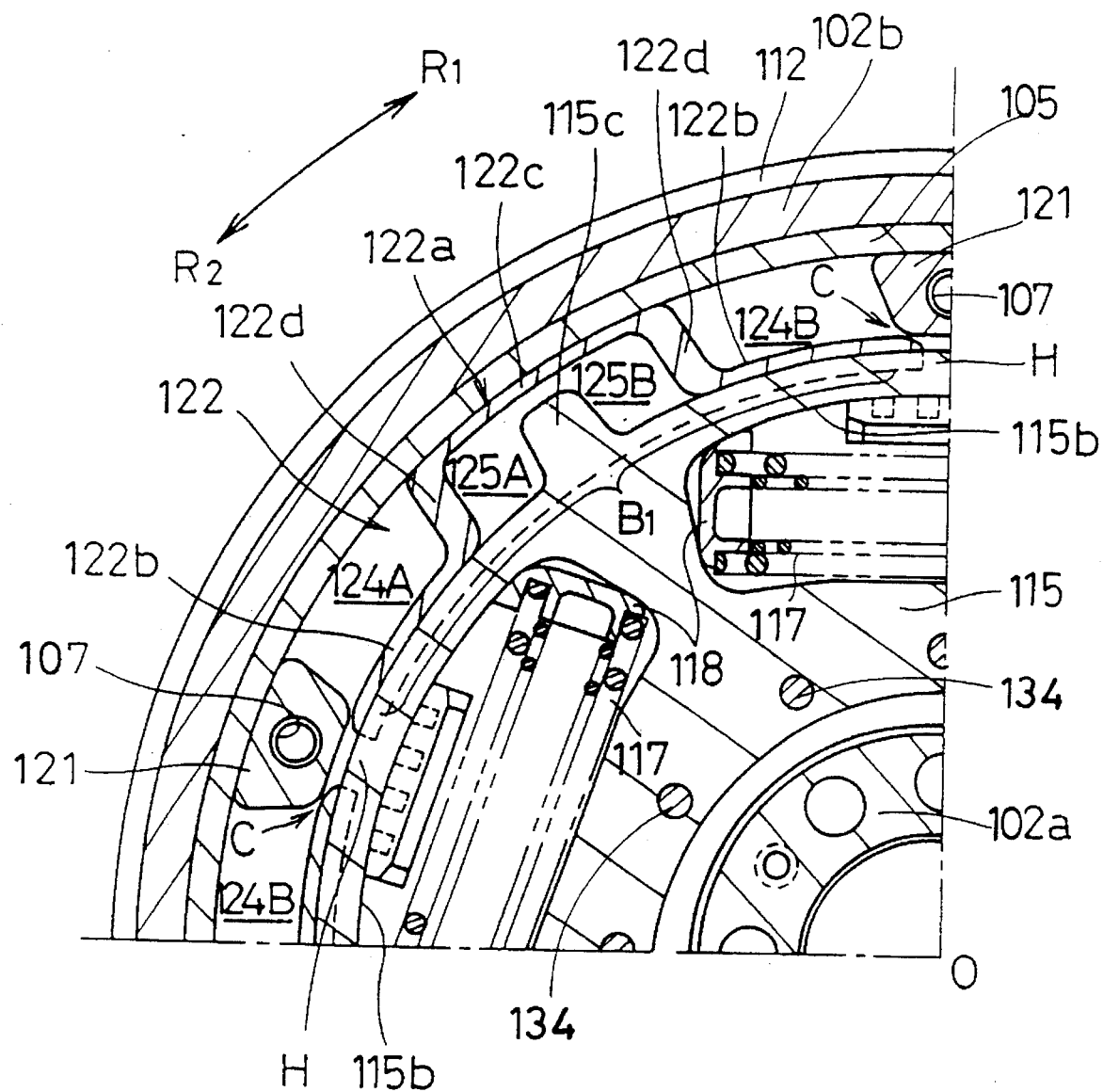
FIG. 19 is a fragmentary view of a portion of FIG. 15 on an enlarged scale.
Figure 20:
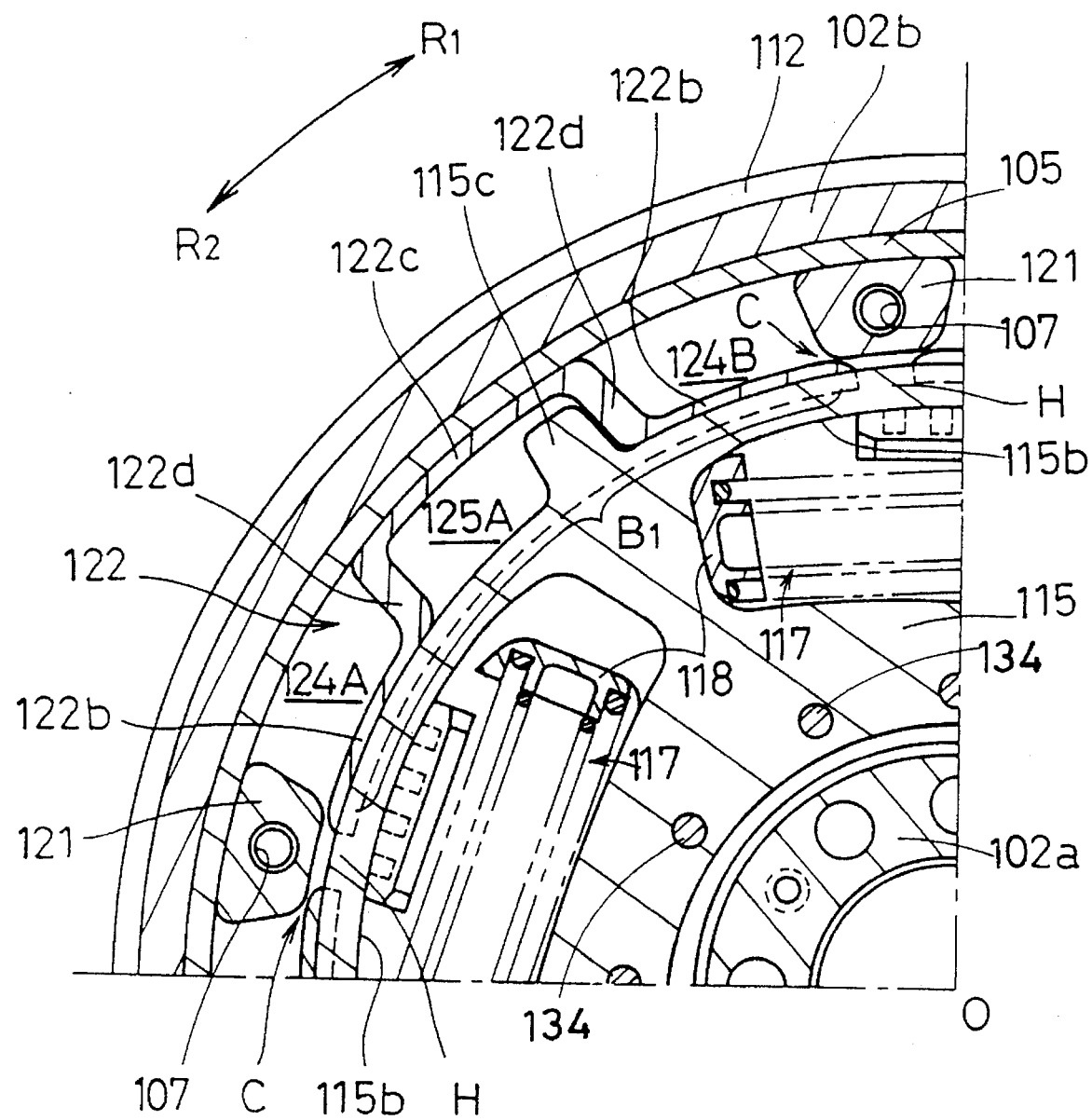
FIG. 20 is similar to FIG. 19 but shows relative displacement of portions of the fluid dampening mechanism and the flywheel assembly.

From the torsion free state shown in FIG. 19, the first flywheel (102) and the driven plate (105) twist in the R2 direction relative to the driven plate (115). When this occurs, the slide stopper (122) moves in the R2 direction together with the first flywheel (102). When this occurs, as shown in FIG. 18, the small chamber (125B) contracts and the small chamber (125A) expands. When the stopper portion (122b), on the R1 side, makes contact with the protrusion (115c) as shown in FIG. 20, the slide stopper (122) contacts and is stopped against the protrusion (115c) of the driven plate (115). As displacement continues in the R2 direction, relative rotation occurs between the first flywheel (102) and the slide stopper (122). When the large chamber (124B) contracts and the large chamber (124A) expands, the viscous fluid inside the large chamber (124B) flows through the choke (C) and into the large chamber (124A) on the R1 side. When the viscous fluid flows through the choke (C), a large viscous resistance generates. Further, during this time, the seal material (122b) of the slide stopper (122) is strongly forced against the annular concave portion (102b) of the first flywheel (102) and the annular concave portion (105a) of the seal plate (105) due to pressure occurring inside the large chamber (124B) improving the sealing properties of the fluid chamber (B) and causing frictional movement of both sides.

Moreover, during the previous stated operation, viscous fluid flows through the return hole (H) from the annular space (A) and quickly fills up.

When the first flywheel (102) and the seal plate (105) are displaced in the R1 direction from the position shown in FIG. 21, the viscous fluid flows through the neutral position and the action goes through the steps depicted in FIG. 21, then proceeding to FIG. 20 and returning to the state depicted in FIG. 19.

From the above explanation, a large viscous resistance can be obtained during large vibrations. Further, when the torsional vibrations grow larger, the seal material (118) of the coil spring (117) makes complete contact with the edge of the orifice (115b). Consequently, the rigidity that can be obtained increases. Namely, for torsional vibrations having a large deflection angle, high-rigidity and large resistance can be obtained and vibrations during dip-in/dip-out effectively dampened. As shown in FIG. 21, in a displaced state the first flywheel (102) transmits very small vibrations to the R2 side in a fixed angle relative to the driven plate (115). When this occurs, the slide stopper (122) repeatedly twists back and forth relative to the protrusion (115c) within an angle range in which the stopper portion (122d) makes contact with the protrusion (115c). During this time, only a small viscous resistance generates while very small torsional vibrations of the deflection angle can be effectively absorbed. Namely, even if the torsional angle between the first flywheel (102) and the driven plate (115) becomes large, a small viscous resistance relative to the very small vibrations can generate.

The following two advantages can be obtained by a construction that omits the conventional fluid chamber housing and driven plate and forms a fluid chamber (B) by the first flywheel (102) and the seal plate (105).

The first advantage is simplifying the construction by reducing the number of parts needed to construct the viscous dampening mechanism (109) in the flywheel assembly (101). The second advantage is increasing the cross-sectional area of the annular fluid chamber (B) by 1.5 times. These advantages increase the viscous resistance while the fluid flows through the choke.

Furthermore, because the slide stopper (122) seals the inner peripheral side of the large chambers (124A, 124B), the sealing mechanism of the fluid chamber (B) is greatly simplified.

In this implementation example, the driven plate (115) and the second flywheel (103) are connected by a rivet (134).

Consequently, the necessity of forming a serration on both materials in order to connect the driven plate (115) and the second flywheel (103) is eliminated which reduces the manufacturing cost. The reason the conventional driven plate (115) and the second flywheel (103) could move in the axial direction in the serration is because a seal channel was formed in the driven plate (115) which increased the precision required of the driven plate's (115) axial direction dimensions. In this implementation example, because a seal channel is not required in the driven plate (115), the precision required of the axial direction dimensions can be lowered which allows the driven plate (115) and the second flywheel (103) to be fixed by a rivet (134) and torsional vibrations to be effectively dampened.

Moreover, because the slide stopper (122) integrates the cap (122a) and the seal portion (122b), it is easy to install and remove it to and from the device.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A flywheel assembly (1) comprising:

a first flywheel (2) with an annular wall (2b) formed on its outer periphery;

a seal plate (5) fixed to an outer radial surface of said annular wall (2b) and extending radially inwardly from said annular wall (2b), said seal plate (5) and said first flywheel (2) at least partially defining an annular space (A) therebetween;

a driven plate (15) arranged to rotate freely relative to said first flywheel (2) within said annular space (A), said driven plate (15) formed with a plurality of spaced apart protrusions (15c) on its outer radial surface;

an elastic coupling mechanism (8) disposed within said annular space (A) elastically connecting said first flywheel (2) and said driven plate (15);

a fluid filled chamber (B) defined within the outer periphery of said annular space (A), said protrusions (15c) extending into said fluid filled chamber (B);

a plurality of radially spaced apart stoppers (21) fixed to said first flywheel (2) within said fluid filled chamber (B);

a plurality of sliders (22), each slider (22) having a hollow interior open toward an axial center of said first flywheel (2), one slider (22) disposed between each adjacent pair of said stoppers (21), configured to slide radially within said fluid filled chamber (B) between said adjacent stoppers (21), one of each of said protrusions (15c) extending into one of each of said sliders (22), each one of said sliders (22) and said adjacent stoppers (21) defining large sub-chambers (24A) and (24B) between said stoppers (21) and on either side of said sliders (22), said protrusions (15c) defining small sub-chambers (25A) and (25B) within each slider (22); and a plurality of radially spaced apart seal members (23) disposed within said fluid filled chamber (B), radially inside said stoppers (21) and said sliders (22), and radially adjacent to said outer radial surface of said driven plate (15), a gap between each adjacent pair of said seal members (23) defining a fluid flow path between said fluid flow chamber (B) and said annular space (A).

2. The flywheel assembly (1) as in claim 1, wherein:

said first flywheel (2) further comprises a plurality of annularly spaced apart first lips (2d) which protrude in an axial direction toward said seal plate (5);

said seal plate (5) further comprises a plurality of annularly spaced apart second lips (5b) which protrude in an axial direction toward said first flywheel (2), in general correspondence with said first lips (2d); and each of said seal members (23) contacts an outer radial surface of said first and second lips (2d) and (5b).

3. The flywheel assembly (1) as in claim 2 wherein each of said seal members (23) extends from within one of said sliders (22) to within an adjacent one of said sliders (22).

4. The flywheel assembly (1) as in claim 3, wherein said gap defining said fluid flow path is adjacent to but slightly offset from said protrusions (15c) on said driven plates (15) in a torsion free state.

5. The flywheel assembly as in claim 2 wherein said seal members and said sliders are integrally formed such that each of said sliders has one of said seal members extending from each radial side portion of said slider.

6. The flywheel assembly as in claim 5 wherein in a torsion free state, said gap defining said fluid flow path being adjacent to said stoppers.

7. The flywheel assembly (1) as in claim 1 wherein said seal member comprises:

a plurality of annularly spaced apart lips formed on said first flywheel;

a plurality of annularly spaced apart lips formed on said driven plate adjacent to said outer radial surface;

an annular groove formed in said driven plate corresponding to said lips formed on said first flywheel, said flywheel lips protruding into said driven plate groove;

a groove formed in said seal plate corresponding to said driven plate lips, said driven plate lips protruding into said seal plate lips; and a gap formed between adjacent pairs of said driven plate lips and said flywheel lips defining said fluid flow path, in a torsion free state, said gaps slightly offset and adjacent to said protrusions.

8. A flywheel assembly (1) comprising:

a first flywheel (2) having an annular space (A) partially confined by said first flywheel (2);

a driven plate (15) arranged to rotate freely relative to said first flywheel (2) within said annular space (A), said driven plate (15) having a plurality of radially extending protrusions (15c);

an elastic coupling mechanism (8) that elastically connects said first flywheel (2) and said driven plate (15) circumferentially;

a viscous dampening mechanism (9) disposed within said annular space (A) having a fluid filled chamber (B) arranged between said first flywheel (2) and said driven plate (15) that includes a plurality of openings through which said plurality of protrusions (15c) extend;

a choke formed within said fluid filled chamber (A) allowing the passage of fluid in response to rotary displacement of said first flywheel (2) and said driven plate (15) relative to each other;

a plurality of radially spaced apart seal members (23) disposed within said fluid filled chamber (B) and radially adjacent to an outer radial surface of said driven plate (15).

9. The flywheel assembly (1) as in claim 8 wherein said viscous dampening mechanism (9) further includes a plurality of stoppers (21) that divide the inside of said fluid filled chamber (B) into a plurality of arc-shaped chambers; and a plurality of sliders (22) arranged to move circumferentially inside said fluid filled chamber (A) relative to said first flywheel (2) and within an established angle range relative to said driven plate (15);

wherein one of each of said seal members (23) extends circumferentially between adjacent ones of said sliders (22) and disposed radially inward from said stoppers (21).

10. A flywheel assembly (1) comprising:

a first flywheel (2) having an annular space (A) partially confined by said first flywheel (2);

a driven plate (5) arranged to rotate relative to said first flywheel (2) within said annular space (A), said driven plate (15) formed with a plurality of radially extending protrusions (15c);

an elastic coupling mechanism (8) that elastically connects said first flywheel (2) and said driven plate (15) circumferentially;

a viscous dampening mechanism (9) having a fluid filled chamber (B) formed between said first flywheel (2) and said driven plate (15) that includes an opening into which said protrusions (15c) extend;

a plurality of stoppers (21) that divide the inside of said fluid filled chamber (B) into a plurality of arc-shaped chambers;

a slider (22) arranged inside each of said arc-shaped chamber;

a choke that allows for the passage of fluid inside said fluid filled chamber (B) in response to movement of said sliders (22) relative to said first flywheel (2); and a plurality of radially spaced apart seal members (23) disposed within said fluid filled chamber (B) and radially adjacent to an outer radial surface of said driven plate (15);

wherein one of each of said seal members (23) extends circumferentially between adjacent ones of said sliders (22) and disposed radially inward from said stoppers (21).

* * * * *